(12) United States Patent
Noumura et al.

(10) Patent No.: US 8,903,619 B2
(45) Date of Patent: Dec. 2, 2014

(54) VEHICLE CONTROL SYSTEM

(75) Inventors: Shin Noumura, Susono (JP); Ken Koibuchi, Hadano (JP); Kaiji Itabashi, Gotenba (JP); Toshio Tanahashi, Susono (JP); Keisuke Takeuchi, Susono (JP); Hiroyuki Hanamura, Gotenba (JP); Yoji Takanami, Anjo (JP); Norimi Asahara, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 484 days.

(21) Appl. No.: 13/389,675

(22) PCT Filed: Aug. 12, 2010

(86) PCT No.: PCT/IB2010/001998
§ 371 (c)(1),
(2), (4) Date: Mar. 2, 2012

(87) PCT Pub. No.: WO2011/021084
PCT Pub. Date: Feb. 24, 2011

(65) Prior Publication Data
US 2012/0221228 A1    Aug. 30, 2012

(30) Foreign Application Priority Data

Aug. 18, 2009 (JP) ................................. 2009-189499
Mar. 12, 2010 (JP) ................................. 2010-056596

(51) Int. Cl.
*G06F 19/00* (2011.01)
*B60W 30/02* (2012.01)
*B60W 40/09* (2012.01)

(52) U.S. Cl.
CPC ............... *B60W 30/02* (2013.01); *B60W 40/09* (2013.01)

USPC ............................. 701/70; 701/111; 180/197

(58) Field of Classification Search
CPC ............................. B60T 8/17555; B60K 28/16
USPC ........... 701/70, 75, 82, 84, 93, 101, 111, 114, 701/115; 180/197
See application file for complete search history.

(56) References Cited

U.S. PATENT DOCUMENTS 5,183,128 A * 2/1993 Ito et al. ......................... 180/197
5,269,391 A * 12/1993 Ito et al. ......................... 180/197
(Continued)

FOREIGN PATENT DOCUMENTS

DE         195 33 575 A1    3/1996
DE    10 2008 045 966 A1    5/2009
(Continued)

OTHER PUBLICATIONS

Kondo et al., "Adaptive Shift Scheduling Strategy Introduced Neural Network in Automatic Transmission", proceedings 944 1994-10 of academic symposia held by the Society of Automotive Engineers of Japan, pp. 241-244 (with English-language translation).

(Continued)

*Primary Examiner* — John Kwon
(74) *Attorney, Agent, or Firm* — Oliff PLC

(57) ABSTRACT

In a vehicle control system that obtains an index based on a running condition of a vehicle and changes a running characteristic of the vehicle according to the index, includes index setting means for making a change in the index in response to a change in the running condition in a direction toward crisp running of the vehicle, faster than a change in the index in response to a change in the running condition in such a direction as to reduce crispness with which the vehicle is running.

18 Claims, 12 Drawing Sheets

(56) References Cited

U.S. PATENT DOCUMENTS

| | | | |
|---|---|---|---|
| 5,717,591 A | 2/1998 | Okada et al. | |
| 2005/0143893 A1 | 6/2005 | Takamatsu et al. | |
| 2009/0107747 A1 | 4/2009 | Luehrsen et al. | |
| 2011/0212090 A1* | 9/2011 | Pedersen et al. | 424/133.1 |
| 2013/0184934 A1* | 7/2013 | Takeuchi et al. | 701/37 |

FOREIGN PATENT DOCUMENTS

| | | |
|---|---|---|
| EP | 1 967 432 A1 | 9/2008 |
| JP | A-6-249007 | 9/1994 |
| JP | A-7-156815 | 6/1995 |
| JP | A-8-80823 | 3/1996 |
| JP | A-9-242863 | 9/1997 |
| JP | A-10-77893 | 3/1998 |
| JP | A-11-129924 | 5/1999 |
| JP | A-2000-320659 | 11/2000 |
| JP | A-2004-257434 | 9/2004 |
| JP | A-2008-120172 | 5/2008 |
| JP | A-2009-47269 | 3/2009 |
| JP | A-2009-530166 | 8/2009 |
| JP | A-2009-197673 | 9/2009 |
| WO | WO 03/059680 A1 | 7/2003 |
| WO | WO 2007/107363 A1 | 9/2007 |

OTHER PUBLICATIONS

Feb. 3, 2011 International Search Report issued in PCT/IB2010/001998.
Feb. 3, 2011 Written Opinion issued in PCT/IB2010/001998.
Aug. 16, 2011 International Preliminary Report on Patentability issued in PCT/IB2010/001998.

* cited by examiner

VEHICLE CONTROL SYSTEM

BACKGROUND OF THE INVENTION

1. Field of the Invention

The invention relates to a vehicle control system that is configured to control behavior characteristics or acceleration/deceleration characteristics (which will be called "running characteristics") of the vehicle, such as a power characteristic, steering characteristic and a suspension characteristic of the vehicle, so that the running characteristics match a running environment and driver's preferences and intention regarding running.

2. Description of the Related Art

While the vehicle behavior, such as a vehicle speed and a running direction, varies according to the driver's accelerating/decelerating operation and steering operation, the relationship between the amount of the driver's operation and the amount of change of the behavior is determined not only by the energy efficiency, such as a fuel efficiency, but also by characteristics, such as a ride comfort, quietness and power performance, which are required of the vehicle.

In the meantime, environments in which the vehicle runs include a wide variety of surroundings or road types, such as an urban area, an expressway, a winding road, an uphill, and a downhill, and there are a variety of driver's preferences and intentions regarding running, and there are a variety, of impressions the driver receives from the vehicle during running. Therefore, an expected running characteristic is not necessarily obtained if the running environment changes or the vehicle is driven by another driver. As a result, so-called driveability may deteriorate.

Thus, one type of vehicle has been developed which is arranged to manually select running characteristics, such as a power output characteristic (or acceleration characteristic) and a suspension characteristic, concerning the behavior of the vehicle, by operating a mode selection switch. Namely, the vehicle is arranged to manually select a drive mode from, for example, a sporty mode in which the vehicle runs with an excellent accelerating ability, and the suspension is set to be somewhat hard, a normal mode in which the vehicle accelerates at a relatively low rate, and has a relatively soft suspension characteristic, and an eco mode in which the fuel economy or efficiency is prioritized, by operating the switch.

Also, various systems have been proposed which are configured to cause the driving orientation to be reflected by behavior control of the vehicle. This type of system does not necessitate any switching operation, and permits changes of subtle or detailed characteristics. One example of this type of system is described in Japanese Patent Application Publication No. 06-249007 (JP-A-06-249007). In the system described in JP-A-06-249007, which is a driving force control system using a neurocomputer, the relationship of the acceleration with respect to the acceleration stroke and the vehicle speed is learned as a required acceleration model, and the throttle opening is calculated based on a deviation between the, model and a second reference acceleration model that reflects the driver's orientation or preferences in connection with running, and a deviation between the second reference acceleration model and a first reference acceleration model as a standard model.

Also, a system that is configured to detect the driving characteristics or driving orientation while distinguishing those of the longitudinal direction of the vehicle from those of the lateral direction is described in Japanese Patent Application Publication No. 11-129924 (JP-A-11-129924). The system described in JP-A-11-129924 obtains an acceleration/braking model of the driver, based on control input information, such as the amount of operation of the accelerator pedal or brake pedal, and behavior information, such as a longitudinal acceleration, and also obtains a steering model of the driver, based on lateral operation information, such as a steering angle, and lateral behavior information, such as a yaw rate.

Both of the systems described in JP-A-06-249007 and JP-A-11-129924 are configured to detect the relationship between the amount of operation performed by the driver and the amount of change of the vehicle behavior achieved by the driver's operation. Like these systems, a system configured to estimate the driving orientation or preferences using variables associated with driving operations, which are derived from the driver's operations, is described in Japanese Patent Application Publication No. 09-242863 (JP-A-09-242863). More specifically, the system described in JP-A-09-242863 is configured to estimate the driving orientation of the vehicle, based on the output of a neural network that receives at least one of the amount of output operation at the time of start of the vehicle, the maximum rate of change of the output operation amount, the maximum deceleration during braking of the vehicle, coasting time of the vehicle, and the constant-vehicle-speed running time.

On the other hand, a system configured to cause the driving orientation and road conditions to be reflected by shift control is described in Japanese Patent Application Publication No. 07-156815 (JP-A-07-156815). The driving orientation is denoted as "crispness" in JP-A-07-156815, and, the crispness representing a driving condition of the driver is estimated by obtaining the frequency distribution for each of vehicle operating parameters including the vehicle speed, accelerator pedal stroke, and the longitudinal acceleration and lateral acceleration of the vehicle, and entering the average value and distribution of each frequency distribution into a neural network.

A driving force control system that aims at performing driving force control that more accurately reflects the driver's intention represented by the amount of operation of the vehicle is described in Japanese Patent Application Publication No. 2008-120172 (JP-A-2008-120172). The system described in JP-A-2008-120172 is configured to control the vehicle speed based on the actual vehicle speed, and a target vehicle speed set based on the driver's intention, and change the manner of controlling the vehicle speed according to the lateral acceleration, such that the degree of the change is changed based on a relative vehicle speed between the actual vehicle speed and the target vehicle speed.

A shift control system configured to accurately determine a driver's intention regarding running and perform shift control that reflects the driver's intention is described in Japanese Patent Application Publication No. 2004-257434 (JP-A-2004-257434). In the system as described in JP-A-2004-257434, the absolute value of the vehicle acceleration is integrated for each given period of time so that the integral is updated. When the integral is larger than a first reference value, a first shift schedule is changed to a second shift schedule in which shift lines in a region of at least a part of the first shift schedule are changed to higher-vehicle-speed shift lines, and shift control is performed based on the second shift schedule.

In addition, a system configured to change the content of shift control in accordance with the degree of sportiness is described in the proceedings 944 1994-10 (p. 241-p. 244) of academic symposia held by the Society of Automotive Engineers of Japan. The system is configured to change the vehicle speed according to the gradient of the road and the manner of driving, and is configured to determine the manner of driving based on the degree of sportiness. The degree of sportiness is determined based on the larger value of the engine load and a degree of tire load, where the degree of tire load is represented by a degree of load relative to the limit friction force of the tire.

Although the systems described in JP-A-06-249007, JP-A-11-129924, JP-A-09-242863, JP-A-07-156815, JP-A-2008-120172, JP-A-004-257434, and the proceedings 944 1994-10 (p. 241 -p. 244) of academic symposia held by the Society of Automotive Engineers of Japan execute control that reflects the driver's intention regarding running, the systems leave room for improvement.

SUMMARY OF INVENTION

The invention provides a vehicle control system that causes driver's preferences and intention regarding running or running conditions of the vehicle to be accurately reflected by running characteristics, such as the behavior of the vehicle or the acceleration.

A vehicle control system according to a first aspect of the invention, which obtains an index based on a running condition of a vehicle, and changes a running characteristic of the vehicle according to the index, includes index setting means for making a change in the index in response to a change in the running condition in a direction toward crisp running of the vehicle, faster than a change in the index in response to a change in the running condition in such a direction as to reduce crispness with which the vehicle is running.

According to the vehicle control system of the first aspect of the invention, the index based on a running condition of the vehicle changes relatively quickly in the direction in which the crispness in running of the vehicle increases, rather than in the direction in which the crispness is reduced. As a result, the vehicle controlled by the vehicle control system provides running characteristics suitable for a running environment, such as the type of the road on which the vehicle is running, and the driving orientation.

In the vehicle control system according to the first aspect of the invention, the index may be increased so as to increase the crispness with which the vehicle is running, and the index setting means may increase the index upon a change of the running condition when the running condition changes in such a direction as to increase the index, while the index setting means may reduce the index with a delay relative to a change of the running condition, when the running condition changes in such a direction as to reduce the index.

In the vehicle control system according to the first aspect of the invention, the running condition may include a composite acceleration including a longitudinal acceleration component and a lateral acceleration component of the vehicle, and the index setting means may set the index to a larger value as the composite acceleration is larger.

Since the vehicle is subjected to not only the longitudinal acceleration but also the accelerations in the lateral direction and turning direction during running, the vehicle control system according to the first aspect of the invention determines the index so that the index reflects these accelerations. In other words, the index may reflect the actual behavior of the vehicle with improved accuracy.

In the vehicle control system according to the first aspect of the invention, the composite acceleration may include an acceleration obtained by combining absolute values of acceleration components in at least two directions including the longitudinal acceleration component and the lateral acceleration component.

In the vehicle control system according to the first aspect of the invention, the composite acceleration may include an acceleration represented by the square root of the sum of squares of respective acceleration components in a plurality of directions.

In a vehicle control system according to a second aspect of the invention, which changes a running characteristic as a tendency of change in the behavior of a vehicle, based on a running condition of the vehicle, the vehicle includes an actuator capable of changing the running characteristic, and the running condition of the vehicle includes an acceleration in a slanting direction including a longitudinal component and a lateral component, the slanting direction being inclined relative to a longitudinal direction and a lateral direction of the vehicle on a horizontal plane. The vehicle control system includes characteristic changing means for changing the running characteristic of the vehicle, by changing an operating state of the actuator based on the acceleration in the slanting direction.

According to the vehicle control system of the second aspect of the invention, the operating state of the actuator is changed based on the accelerations in a plurality of directions of the vehicle, so as to change the running characteristic. Thus, the vehicle control system may set the running characteristic so that it reflects the actual behavior of the vehicle with improved accuracy.

A vehicle control system according to a third aspect of the invention, which changes a running characteristic as a tendency of change of the behavior of a vehicle, based on an acceleration including acceleration components in a plurality of directions, includes synthesizing means for making a change of the running characteristic based on the acceleration component in one of the above-indicated plurality of directions different from a change of the running characteristic based on the acceleration component in another direction.

According to the vehicle control system of the third aspect of the invention, when the running characteristic of the vehicle is changed so as to reflect the accelerations in the two or more directions, an influence of the change on the acceleration actually applied to the vehicle and the behavior of the vehicle varies depending on the direction of the acceleration; therefore the difference may be reflected by the running characteristic when it is changed.

In the vehicle control system of the third aspect of the invention, the acceleration components in the plurality of directions include a speed-decreasing longitudinal acceleration of the vehicle, and a speed-increasing longitudinal acceleration of the vehicle; and the speed-decreasing longitudinal acceleration and the speed-increasing longitudinal acceleration are corrected by at least one of a normalization operation, a weighting operation, and combination of the normalization operation and the weighting operation so that an influence of the speed-increasing longitudinal acceleration is larger than an influence of the speed-decreasing longitudinal acceleration.

A vehicle control system according to a fourth aspect of the invention, which changes a running characteristic of the vehicle according to an index based on a running condition of the vehicle, includes index changing means for changing the index so as to provide a running characteristic that crispness in running of the vehicle increases as at least one of time lapsed, a distance travelled, and a composite acceleration during the time after a start of running of the vehicle increases.

According to the vehicle control system of the fourth aspect of the invention, the index increases with a lapse of time after the vehicle starts running, or the index increases with increase in the distance travelled, or with increase in the composite acceleration during the time, so that the crispness of running is improved according to the index.

In the vehicle control system according to the fourth aspect of the invention, the index may increase so as to increase the crispness in running of the vehicle, and the index changing means may set the index to a larger value as a composite acceleration that includes acceleration components in at least two directions including a longitudinal acceleration component and a lateral acceleration component of the vehicle increases.

In the vehicle control system according to the first aspect of the invention, the index setting means may repeatedly obtain the index during running of the vehicle, and the index setting means may include index holding means for holding the index at an obtained value when the obtained value of the index is larger than the last value, and index reducing means for reducing the value of the index held by the index holding means under a predetermined condition. The predetermined condition may be satisfied depending on a length of time for which the index is kept being smaller than the value held by the index holding means.

According to the vehicle control system of the first aspect of the invention, if the index becomes a large value due to a change of the running condition, the index is kept at the large value; thus, the index is updated each time a larger value than the current value is obtained. On the other hand, even if an index value obtained based on the running condition is smaller than the previous value, the index is held at the previous value until a condition in terms of time is satisfied, and is then reduced when the condition is satisfied. Accordingly, the index and the running characteristic based on the index are reduced at a lower rate or reduced frequency than that of the case where they are increased.

In the vehicle control system according to the first aspect of the invention, the condition may include a condition that a value obtained by integrating a deviation between the obtained value of the index and the value of the index held by the index holding means with respect to time exceeds a predetermined value.

According to the vehicle control system of the first aspect of the invention, in order to delay reduction of the index, an integral value of a deviation or difference between the index held at a given value and the index obtained at each point in time, with respect to time, is calculated, and the index value is held at the given value until the integral value becomes equal to the predetermined value, even if the currently obtained index value is relatively low. Then, if the value of the currently obtained index becomes close to or larger than the value held at the given value, the integral value is reset, and the reduction of the index may be further delayed.

In the vehicle control system according to the first aspect of the invention, when the time integral value of the deviation between the obtained value of the index and the value of the index held by the index holding means is equal to or smaller than a predetermined threshold value, the index setting means may reset the time integral value of the deviation and may return the time integral value of the deviation to zero.

In the vehicle control system according to the first aspect of the invention, the index reducing means may delay satisfaction of the condition when the time integral value of the deviation between the obtained value of the index and the value of the index held by the index holding means is equal to or smaller than a predetermined threshold value.

In the vehicle control system according to the first aspect of the invention, the index reducing means may reduce the value of the index at a reduced rate when the time lapsed until the condition is satisfied is relatively long, as compared with the case where the elapsed time is relatively short.

According to the vehicle control system of the first aspect of the invention, the index is reduced at a lower rate when it takes a long time until the condition for reduction is satisfied, than that in the case where it takes a short time until the condition for reduction is satisfied, so that the index may be set to a value that is more suitable for the running environment or the intention regarding running.

In the vehicle control system according to the first aspect of the invention, the index setting means may obtain a time accumulated value of the deviation by reducing the time accumulated value of the deviation when the satisfaction of the condition is delayed.

According to the vehicle control system of the first aspect of the invention, when a difference between the value of the index held at a given value and the newly obtained value of the index is small, the running condition at this time is not regarded as a factor or cause of change of the index. Accordingly, accumulation of the elapsed time based on which the condition is satisfied is stopped, or the accumulated time is reduced, so as to prevent the running characteristic from being changed (reduced) with excessive sensitivity.

In the vehicle control system according to the second aspect of the invention, the actuator may include at least one of an actuator operable to change a throttle opening of an engine installed on the vehicle, an actuator operable to change a speed ratio of an automatic transmission installed on the vehicle, an actuator provided in a suspension mechanism of the vehicle and operable to change a suspension characteristic, an actuator operable to change a turning characteristic of the vehicle, and an actuator operable to change a ratio of power distributed to front wheels and rear wheels of the vehicle.

According to the vehicle control system of the second aspect of the invention, the characteristics of the actuators related to the acceleration characteristic, turning characteristic, and vibration damping characteristic of the vehicle may be made suitable for the running environment or the driving orientation.

In the vehicle control system according to the first aspect of the invention, the vehicle may include a driving power source, and a rotational speed control mechanism that controls a rotational speed of the driving power source, and the vehicle control system may further include sporty-mode rotational speed calculating means for determining a target rotational speed of the driving power source, based on the index, normal-mode rotational speed calculating means for determining a target rotational speed of the driving power source, based on a stroke of an accelerator pedal operated by a driver, and a vehicle speed; and final rotational speed specifying means for controlling the rotational speed control mechanism so as to achieve a target rotational speed that is a larger value of the target rotational speed determined by the sporty-mode rotational speed calculating means and the target rotational speed determined by the normal-mode rotational speed calculating means.

According to the vehicle control system according to the first aspect of the invention, when the target rotational speed of the driving power source obtained based on the index is larger than the target rotational speed obtained based on the requested amount of driving force represented by the accelerator pedal stroke or throttle opening, the rotational speed of the driving power source is controlled so as to achieve the larger rotational speed. Therefore, when the acceleration performance that exceeds the acceleration performance commensurate with the index is requested, the request for acceleration may be reflected by the control of the vehicle. Consequently, the vehicle may be controlled so as to meet with the driver's intention with improved accuracy.

The vehicle control system according to the first aspect of the invention may further include means for holding the target rotational speed determined by the sporty-mode rotational speed calculating means when the vehicle is turning.

In the vehicle control system according to the first aspect of the invention, when the target rotational speed determined by the normal-mode rotational speed calculating means is higher than the target rotational speed determined by the sporty-mode rotational speed calculating means, the final rotational speed specifying means may control the rotational speed control mechanism so as to achieve a rotational speed obtained by interpolating a difference between the target rotational speed determined by the sporty-mode rotational speed calculating means at present time, and a rotational speed that gives rise to a maximum acceleration that is generated in the vehicle, based on the requested amount of driving force.

According to the vehicle control system of the first aspect of the invention, when a request for an acceleration that exceeds the acceleration performance commensurate with the index is made, the rotational speed of the driving power source obtained by dividing an excess of the acceleration up to the maximum rotational speed at this time according to the requested amount of driving force is achieved, so as to permit control that reflects the requested amount of driving force with improved accuracy.

In the vehicle control system of the first aspect of the invention, while the index is increasing, the vehicle control system may not execute control for improving an acceleration performance of the vehicle until the index reaches a first threshold value, and may execute, the control for improving the acceleration performance of the vehicle after the index reaches the first threshold value; and while the index is decreasing, the vehicle control system may execute the control for improving the acceleration performance of the vehicle until the index reaches a second threshold value smaller than the first threshold value, even if the index reaches the first threshold value, and may prohibit the control for improving the acceleration performance of the vehicle after the index reaches the second threshold value.

According to the vehicle control system of the first aspect of the invention, when the index is smaller than the predetermined value due to the absence of crisp running of the vehicle or an operation to run the vehicle with crispness, control for improving the acceleration performance based on the index is not carried out. Accordingly, even if the running condition of the vehicle temporarily changes and the index increases for some reason in a condition where crisp running or an operation to run the vehicle with crispness is not particularly performed, the change of the running condition or operation is not reflected by control for improving the acceleration performance. Therefore, the vehicle is able to keep running mildly with no particular crispness, or with an increased ride comfort. To the contrary, even if the index is reduced to a smaller value than the first threshold value in a condition where the control for improving the acceleration performance based on the index is carried out, the control for improving the acceleration performance based on the index is continued, so as to permit running of the vehicle based on the previous acceleration performance. Consequently, the vehicle may be controlled so as to meet with the driver's intention with improved accuracy. Thus, a hysteresis can be set between the start of the control for improving the acceleration performance in response to an increase of the index value and the end of the control for improving the acceleration performance in response to a reduction of the index value, so as to avoid hunting of control.

The vehicle control system of the first aspect of the invention may further include a switch that prohibits control for changing the running characteristic of the vehicle according to the index.

In the vehicle control system of the first aspect of the invention, the index setting means may repeatedly obtain the index during running of the vehicle; the index setting means may include index holding means for holding the index at an obtained value when the obtained value of the index is larger than the last value, and index reducing means for reducing the value of the index held by the index holding means, based on a time integral value of a deviation between the value of the index held by the index holding means and the obtained value of the index, and a predetermined threshold value; and a manner in which the value of the index held by the index holding means is reduced may be changed according to the time integral value of the deviation.

In the vehicle control system of the first aspect of the invention, the index setting means may repeatedly obtain the index during running of the vehicle; the index setting means may include index holding means for holding the index at an obtained value when the obtained value of the index is larger than the last value, and index reducing means for reducing the value of the index held by the index holding means, based on a time integral value of a deviation between the value of the index held by the index holding means and the obtained value of the index, and a predetermined threshold value; and when the time integral value of the deviation decreases, the value of the index held by the index holding means may be increased.

In the vehicle control system of the first aspect of the invention, the index setting means may repeatedly obtain the index during running of the vehicle; the index setting means may include index holding means for holding the index at an obtained value when the obtained value of the index is larger than the last value, and index reducing means for reducing the value of the index held by the index holding means, based on a time integral value of a deviation between the value of the index held by the index holding means and the obtained value of the index, and a predetermined threshold value; and an output characteristic of a driving source relative to an accelerating operation may be changed according to the value of the index held by the index holding means.

BRIEF DESCRIPTION OF DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Figure 12:
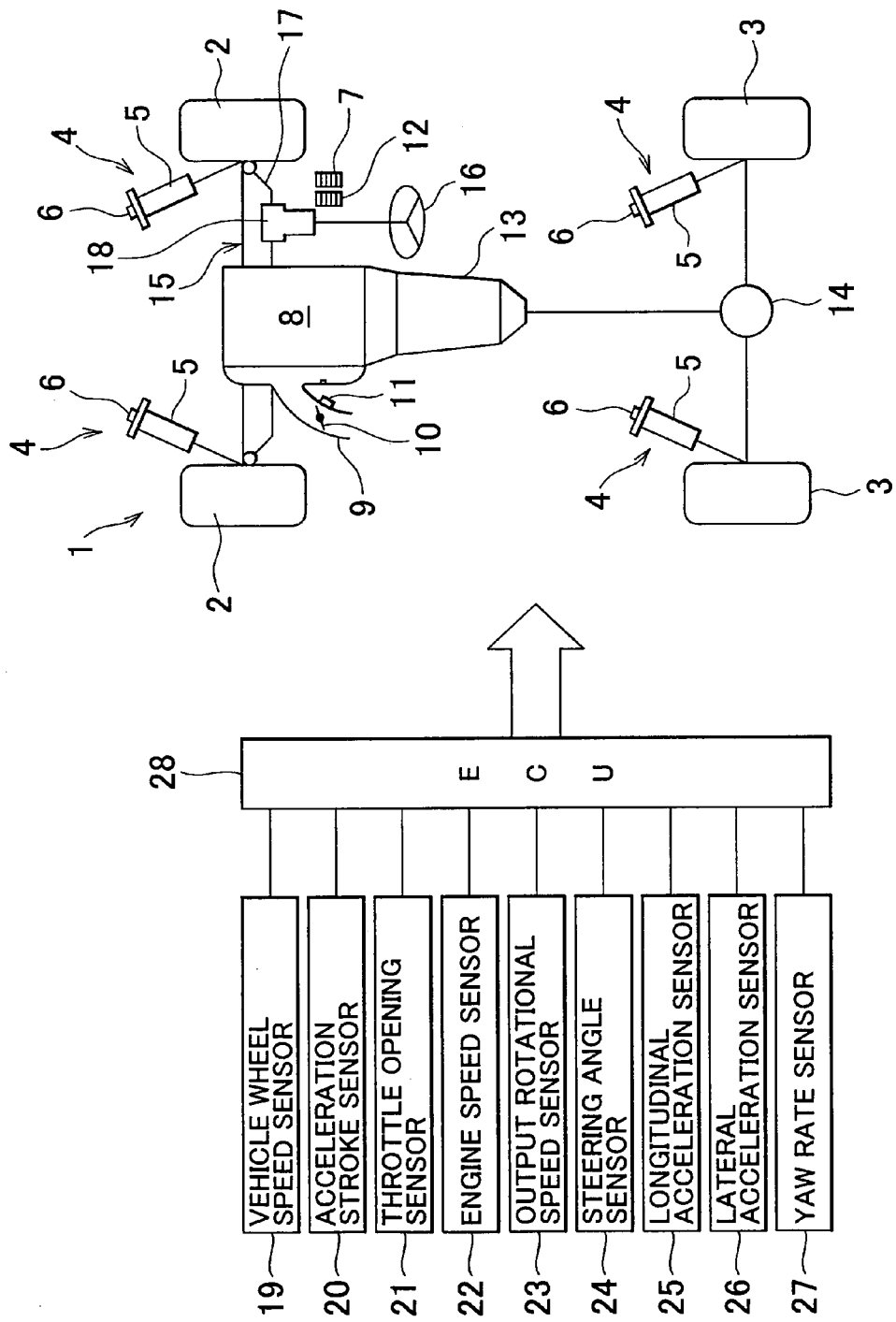
FIG. 12 is a view schematically showing one example of vehicle to which the present invention can be applied.

In the following, one embodiment of the present invention will be more specifically described. The embodiment is applied to vehicles that accelerate, decelerate, and make turns in accordance with the driver's operations, and a typical example of the vehicles is an automobile having an internal combustion engine and/or a motor as a driving power source. One example of the vehicle is illustrated in the block diagram of FIG. 12. The vehicle 1 shown in FIG 12 includes four wheels, i.e., two front wheels 2 as steerable wheels, and two rear wheels 3 as driving wheels. Each of the four wheels 2, 3 is mounted on the vehicle body (not shown) via a suspension system 4. The suspension system 4 consists principally of a spring and a shock absorber (damper), like a generally known suspension system, and the shock absorber 5 is illustrated in FIG 12. The shock absorber 5 shown in FIG 12 is arranged to perform a shock-absorbing or buffering action, using the flow resistance of a fluid, such as gas or liquid, and is constructed such that the magnitude of the flow resistance can be changed by an actuator, such as a motor 6. When the flow resistance is increased, the vehicle body is less likely to squat down, thus giving rise to a hard or harsh ride, and the vehicle behaves as if it provides a reduced ride comfort and an increased sporty feel. The suspension system 4 may be arranged to adjust the vehicle height, by supplying or discharging pressurized gas to or from the shock absorber 5.

Each of the front and rear wheels 2, 3 is provided with a braking device (not shown). When a brake pedal 7 located at the driver's seat is depressed, the braking devices operate to give braking force to the front and rear wheels 2, 3.

The driving power source of the vehicle 1 is a generally known driving power source, such as an internal combustion engine, a motor, or a combination thereof. An internal combustion engine (or engine) 8 is installed on the vehicle shown in FIG. 12, and a throttle valve 10 for controlling the amount of intake air is disposed in an intake pipe 9 of the engine 8. The throttle valve 10, which is an electronic throttle valve, is arranged to be opened and closed by an electrically controlled actuator 11, such as a motor, so that the opening of the throttle valve 10 is adjusted as required. The actuator 11 is arranged to operate in accordance with the amount of depression of an accelerator pedal 12 located at the driver's seat, i.e., the accelerator pedal stroke, so as to control the opening of the throttle valve 10 to a certain throttle opening.

The relationship between the accelerator pedal stroke and the throttle opening can be set as appropriate. As the relationship between these quantities is closer to a one-to-one relationship, the driver is more likely to feel the relationship directly, and the vehicle provides a sporty feel or ride as a running characteristic. To the contrary, if the relationship is set such that the throttle opening is small relative to the accelerator pedal stroke, the behavior characteristic or acceleration characteristic (i.e., running characteristic) of the vehicle becomes mild. In the case where a motor is used as the driving power source, an electric current controller, such as an inverter or a converter, is provided in place of the throttle valve 10, and the current is controlled in accordance with the accelerator pedal stroke. Also, the relationship between the current value and the accelerator pedal stroke, namely, the behavior characteristic or acceleration characteristic (i.e., running characteristic), is changed as appropriate.

A transmission 13 is coupled to the output side of the engine 8. The transmission 13 is arranged to suitably change the speed ratio, i.e., the ratio between the input rotational speed and the output rotational speed. For example, the transmission 13 is a generally known automatic transmission having two or more gear positions, or a continuously variable transmission, such as a belt-and-pulley type CVT or a toroidal type CVT. The transmission 13 includes an actuator (not shown), and the actuator is suitably controlled so as to change the speed ratio stepwise (in steps), or change the speed ratio continuously. More specifically, a shift map is prepared in advance in which the speed ratio is determined in relation to vehicle conditions, such as the accelerator pedal stroke based on the accelerating operation performed by the driver, and the vehicle speed, and the shift control is performed according to the shift map. Alternatively, a target output or power is calculated based on vehicle conditions, such as the vehicle speed and the accelerator pedal stroke, and a target engine speed is obtained from the target output and the optimum fuel line. Then, shift control is performed so as to achieve the target engine speed.

In contrast to the basic shift control as described above, control that gives a higher priority to fuel economy or control for increasing the driving force can be selected. Under the control that gives a higher priority to fuel economy, upshifting is executed at a relatively low vehicle speed, or a relatively high-speed gear ratio or speed ratio is used at a low vehicle speed. Under the control for improving the driving force or acceleration characteristic, upshifting is executed at a relatively high vehicle speed, a relatively low-speed gear ratio or speed ratio is used at a high vehicle speed. These controls may be performed by switching shift maps, or correcting the requested amount of driving force, or correcting the calculated speed ratio. A power transmitting mechanism, such as a torque converter equipped with a lock-up clutch, may be provided as needed between the engine 8 and the transmission 13. The output shaft of the transmission 13 is coupled to the rear wheels 3 via a differential gear 14 serving as a final drive.

A steering mechanism 15 operable to turn the front wheels 2 will be described. A steering linkage 17 is provided for transmitting rotary motion of the steering wheel 16 to the right and left front wheels 2, and an assist mechanism 18 is provided for increasing steering force in relation to the steering angle of the steering wheel 16. The assist mechanism 18 includes an actuator (not shown), and is arranged to adjust the amount of assist force or torque provided by the actuator. More specifically, as the amount of assist force decreases, the relationship between the steering force and the actual turning force applied to the front wheels 2 becomes closer to a one-to-one relationship, thus making the driver feel more directly about the steering and providing a sporty feel or ride as a running characteristic of the vehicle. In this case, the relationship between the steering angle and the actual turn angle of the front wheels 2 becomes close to a one-to-one relationship. Also, in the embodiment, the gear ratio of an electric power steering (EPS) mechanism may be reduced as a command SPI increases, so as to provide a quick characteristic. While the gear ratio is increased as the vehicle speed increases if the command SPI is the same value, the gear ratio may be reduced as the command SPI increases if the vehicle speed is the same.

Although not particularly illustrated in the drawings, the vehicle 1 is provided with an anti-lock brake system (ABS), traction control system, and/or a vehicle stability control system (VSC) that controls these systems in an integrated manner, as a system for stabilizing the behavior or posture of the vehicle 1. These systems are those generally known in the art, and are arranged to prevent or suppress locking or slipping of the vehicle wheels 2, 3 and stabilize the behavior of the vehicle, by reducing braking force applied to the wheels 2, 3 based on a difference between the vehicle body speed and the vehicle wheel speed, or applying braking force to the wheels 2, 3, and controlling the engine torque in addition to the control of the braking force. The vehicle 1 may also be provided with a navigation system capable of obtaining data (i.e., running environment) concerning a road on which the vehicle is running or a road or route along which the vehicle is supposed to run, and a switch for manually selecting a running mode from, for example, a sporty mode, normal mode and a low-fuel-consumption mode (eco mode). Furthermore, the vehicle 1 may be equipped with a four-wheel driving mechanism (4WD) capable of changing running characteristics, such as a hill climbing ability, acceleration performance or accelerating ability, and a turning ability.

Various sensors are provided for obtaining data used for controlling the above-mentioned engine 8, transmission 13, shock absorber 5 of the suspension system 4, assist mechanism 19, and the above-described systems that are not illustrated. The sensors include, for example, a vehicle wheel speed sensor 19 that detects the speeds of rotation of the front and rear wheels 2, 3, acceleration stroke sensor 20, throttle opening sensor 21, engine speed sensor 22, output rotational speed sensor 23 that detects the rotational speed of the output shaft of the transmission 13, steering angle sensor 24, longitudinal acceleration sensor 25 that detects the longitudinal acceleration (Gx), lateral acceleration sensor 26 that detects the acceleration (lateral acceleration Gy) of the lateral direction, yaw rate sensor 27, and so forth. In this connection, acceleration sensors used in vehicle behavior control of the anti-lock brake system (ABS), vehicle stability control system (VSC), or the like may also be used as the acceleration sensors 25, 26. In a vehicle installed with an airbag(s), acceleration sensors provided for control of deployment of the airbag(s) may also be used as the acceleration sensors 25, 26. Also, the longitudinal and lateral accelerations Gx, Gy may be obtained directly from a detection value detected by an acceleration sensor positioned to be inclined at a given angle (e.g., 45°) relative to the longitudinal direction of the vehicle, on a horizontal plane, or may be obtained by dissolving the detection value into a longitudinal acceleration and a lateral acceleration. Also, the longitudinal and lateral accelerations Gx, Gy may be calculated based on the accelerator pedal stroke, vehicle speed, road load, steering angle, etc., instead of being detected by the sensors. These sensors 19-27 are arranged to transmit detection signals (data) to an electronic control unit (ECU) 28, and the electronic control unit 28 is configured to perform calculations according to the above data, pre-stored data and programs, and output the results of calculations as control command signals to the above-described systems or actuators thereof. The composite acceleration is not limited to the acceleration including the acceleration components in a plurality of directions, such as the acceleration including the acceleration component in the longitudinal direction of the vehicle and the acceleration component in the width direction (lateral direction) of the vehicle. The acceleration in only one direction may be employed as the composite acceleration. For example, only the acceleration in the longitudinal direction of the vehicle may be employed as the composite acceleration.

The vehicle control system according to the present invention is configured to cause a running condition of the vehicle to be reflected by the behavior control (running control) of the vehicle. The running condition of the vehicle mentioned herein is represented by the longitudinal acceleration or lateral acceleration, or acceleration of yawing or rolling, or a composite acceleration into which accelerations of the two or more directions are combined. When the vehicle runs at a target speed or travel in a target direction, or when the behavior of the vehicle is returned to the original state in response to an influence of a running environment, such as a road surface, accelerations normally arise in two or more directions. In view of this fact, it is considered that the running condition of the vehicle reflects the running environment or the driving orientation by some degree. On the basis of the background, the vehicle control system of the present invention is configured so that the behavior control of the vehicle reflects the running condition of the vehicle.

As described above, the behavior of the vehicle includes, for example, an acceleration characteristic, turning characteristic, support rigidity (i.e., the degree or likelihood of bumping or rebounding) provided by the suspension system 4, the degree of rolling or pitching, and so forth. The vehicle control system according to the present invention changes these running characteristics based on the above-described running condition. In this case, the running characteristics may be changed by using an acceleration in a certain direction or a composite acceleration as it is, as one example of the above-described running condition. However, in order to reduce uncomfortable feeling, an index obtained by correcting the above-mentioned acceleration or composite acceleration may be used.

A sportiness index SPI as one example of the index will be described. The sportiness index SPI is the index indicating the driver's intention or the running condition of the vehicle. The sportiness index SPI that can be employed in the embodiment is an index obtained by combining accelerations (in particular, their absolute values) in two or more directions, and an acceleration obtained by combining the longitudinal acceleration Gx and the lateral acceleration Gy is an example of acceleration that is greatly related with the behavior of the vehicle in the running direction. For example, an instantaneous SPI is calculated according to the following equation (1). Here, the "instantaneous SPI" means an index, or a physical quantity, which is calculated based on the accelerations of respective directions, each of which is obtained at intervals of a moment during running of the vehicle. The "intervals of a moment" means the intervals of repetition at which the detection of the accelerations and the calculation of the instantaneous SPI based on the accelerations are repeatedly carried out in a given cycle time.

$$\text{Instantaneous SPI} = (Gx^2 + Gy^2)^{1/2} \quad (1)$$

Of the longitudinal acceleration Gx used in the above-indicated equation (1), at least one of the acceleration-side acceleration and deceleration-side acceleration (i.e., deceleration) may be subjected to a normalization operation or a weighting operation. Namely, while the deceleration-side acceleration is larger than the acceleration-side acceleration in general vehicles, the difference is hardly felt or recognized by the driver, and, in many cases, the driver recognizes the acceleration-side and deceleration-side accelerations as being substantially equally applied to the vehicle. The normalization operation is an operation to reduce or eliminate the difference between the actual values and the way the driver feels. For the longitudinal acceleration Gx, the normalization is an operation to increase the acceleration-side acceleration, or reduce the deceleration-side acceleration. More specifically, the ratio of the maximum values of these accelerations is obtained, and the acceleration-side or deceleration-side acceleration is multiplied by the ratio. Also, the weighting operation may be performed to correct the deceleration-side acceleration relative to the lateral acceleration. In sum, the weighting operation is to make a correction by, for example, assigning a weight to at least one of the longitudinal (frontward and backward) accelerations, so that the maximum acceleration in each direction lies on a circle of a given radius, as is the case where the longitudinal force and lateral force that can be produced by a tire are represented by a tire friction circle. Through the normalization operation and the weighting operation as described above, the degrees by which the acceleration-side acceleration and deceleration-side acceleration are reflected by the running characteristics become different from each other. A speed-decreasing longitudinal acceleration and a speed-increasing longitudinal acceleration may be subjected to the weighting operation, as one example of the weighting operation, so that the degree of influence of the speed-increasing longitudinal acceleration is higher than the degree of influence of the speed-decreasing longitudinal acceleration.

Thus, there is a difference between the actual value of the acceleration and the way the driver feels about the acceleration, depending on the direction of the acceleration. For example, such a difference may exist in the acceleration in the yawing direction or rolling direction and the longitudinal direction. According to the embodiment, therefore, the degrees by which the accelerations of different directions are reflected by the running characteristics may be varied, in other words, the degree of change of the running characteristics based on the acceleration in a certain direction may be made different from the degree of change of the running characteristics based on the acceleration in another direction.

Figure 1:
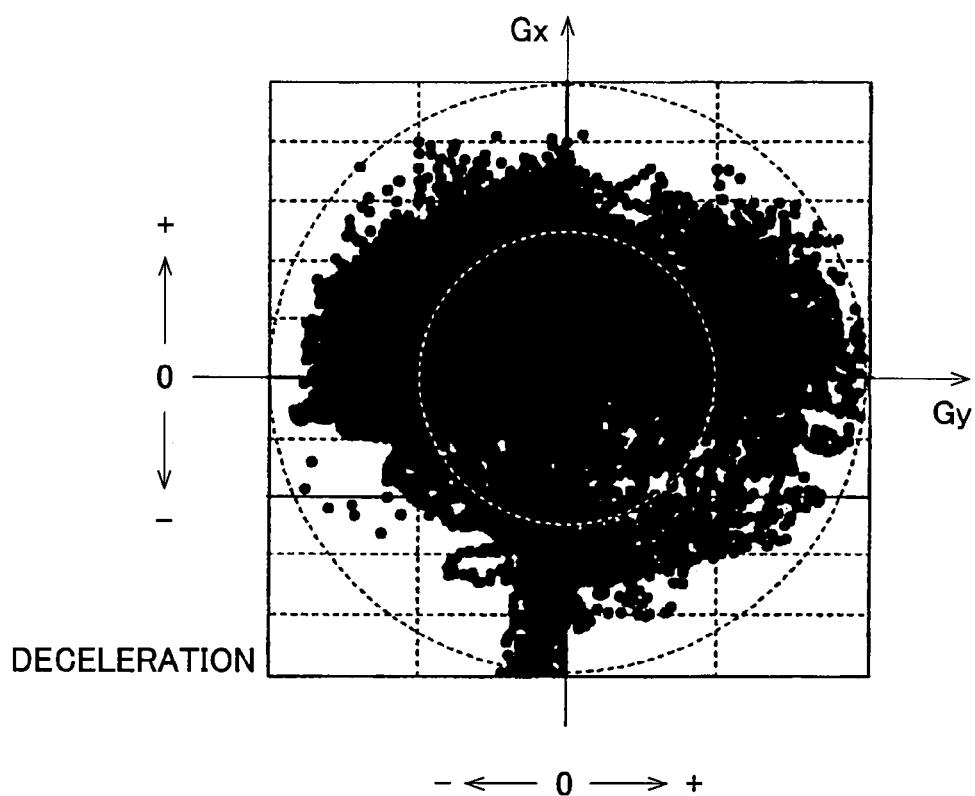
FIG. 1 is a view in which detection values of the longitudinal acceleration and lateral acceleration are plotted on a friction circle of a tire, according to one embodiment of the invention.

FIG. 1 shows an example in which the sensor value of the lateral acceleration Gy and the longitudinal acceleration Gx on which the above-described normalization operation and weighting operation were performed are plotted on a tire friction circle. This is an example where- the vehicle runs along a test course that simulates an ordinary road. It is observed from FIG 1, as a general tendency, that the lateral acceleration Gy is also likely to become large when the vehicle is decelerated by a large degree, and the longitudinal acceleration Gx and the lateral acceleration Gy occur along the tire friction circle.

Figure 2:
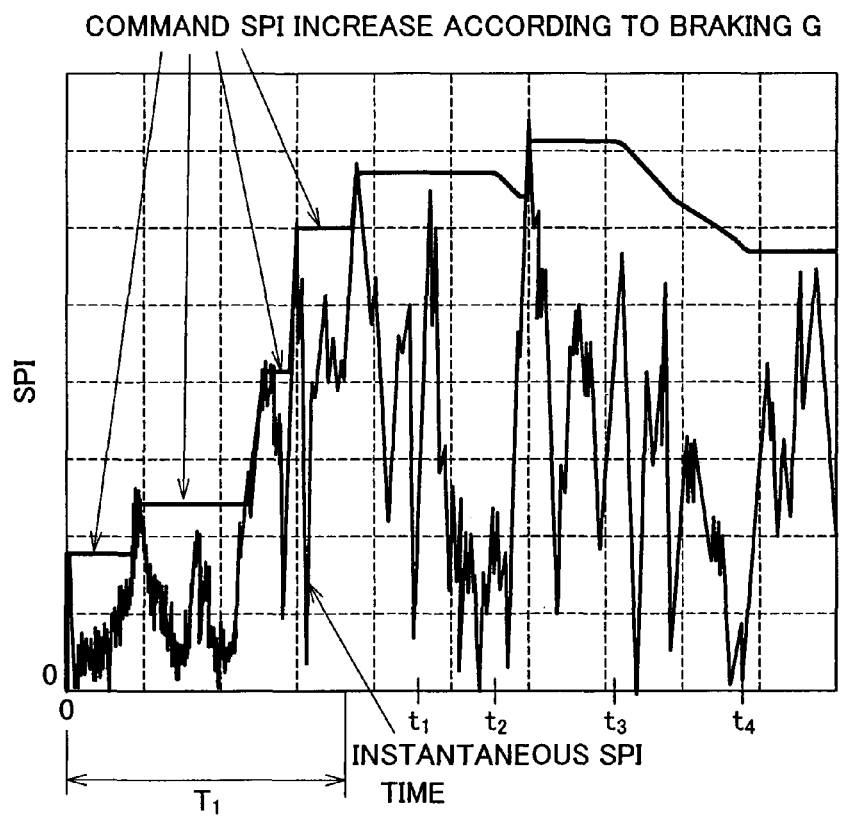
FIG. 2 is a view showing an example of changes in a command SPI based on an instantaneous SPI according to one embodiment of the invention.

According to the embodiment, a command SPI is obtained from the above-indicated instantaneous SPI. The command SPI is an index used in the control for changing the running characteristics. The command SPI immediately increases in response to an increase in the instantaneous SPI based on which the command SPI is calculated, and decreases with delay in response to a reduction in the instantaneous SPI. In particular, the command SPI is reduced when a certain condition is satisfied. FIG. 2 shows changes in the command SPI obtained based on changes in the instantaneous SPI. In the example shown in FIG. 2, the instantaneous SPI is indicated by values plotted in FIG. 1 as described above, whereas the command SPI is set to the maximum value of the instantaneous SPI, and is kept at the same value (i.e., the last value) until a certain condition is satisfied. Namely, the command SPI is an index that changes promptly when it increases, and changes relatively slowly when it decreases.

More specifically, in a time period T1 from the beginning of control in FIG. 2, for example, in the case where the vehicle is decelerating and turning, the instantaneous SPI obtained in each cycle increases and decreases according to the changes in the acceleration. In this period, the instantaneous SPI that exceeds the maximum value of the previous cycles appears before the above-mentioned certain condition is satisfied; therefore, the command SPI increases in steps and the increased command SPI is held. On the other hand, at time t2 and time t3, for example, in the case where the vehicle, which has turned and accelerated, starts to run straight and accelerate, the command SPI is reduced since the condition for reduction is satisfied. Thus, the condition for reducing the command SPI is satisfied when a condition where the command SPI kept at the previous large value is not considered to reflect the driver's intention is established. In the embodiment, the condition is satisfied upon a lapse of a specified time.

Namely, the condition where the command SPI kept at the previous value is not considered to reflect the driver's intention is a condition in which a deviation between the command SPI that is kept at the previous value and the instantaneous SPI that appears in the meantime is relatively large, and the deviation continues to be large and the deviation is accumulated. Accordingly, the command SPI is not reduced due to the instantaneous SPI resulting from, for example, the driver's operation of temporarily releasing the accelerator pedal 12, for example, when the vehicle is controlled to turn and accelerate. When a condition where the instantaneous SPI resulting from, for example, the driver's operation of continuously releasing the accelerator pedal 12 is lower than the kept command SPI continues for a given period of time, for example, when the vehicle gradually decelerates, it is determined that a condition for reducing the command SPI is satisfied. Thus, the condition for starting reducing the command SPI may be the duration for which the instantaneous SPI is kept lower than the command SPI. The condition for starting reducing the command SPI may be that a time integral value (or accumulated value) of a deviation between the kept command SPI and the instantaneous SPI reaches a predetermined threshold value, so that the actual running condition is more precisely reflected by the command SPI. The threshold value may be suitably set by running experiment or simulation conducted according to the driver's intention. In the latter case where the time integral value is used, the command SPI is reduced in view of the deviation between the command SPI and the instantaneous SPI and time, so that the control for changing the running characteristics can be performed which reflects the actual running condition or behavior more precisely.

In the example as shown in FIG. 2, the length of time for which the command SPI is held at the same value until time t2 is reached is greater than the length of time for which the command SPI is held at the same value until time t3 is reached, since the following control is performed. The command SPI is increased to a given value in the final stage of the above-mentioned time period T1, and is held at the given value; then, the instantaneous SPI is increased at time t1 before the condition for starting reduction as described above is satisfied, and further, the integral value of a deviation of the instantaneous SPI from the command SPI held at the given value becomes smaller than a predetermined value. The predetermined value may be suitably set by experiment or simulation conducted according to the driver's intention, or in view of an error in calculation of the instantaneous SPI. Thus, the condition in which the instantaneous SPI becomes close to the command SPI held at the given value means that the vehicle is in an accelerating or decelerating condition and/or a turning condition that gives rise to the instantaneous SPI based on which the command SPI held at the given value was determined, or in a condition close to the accelerating or decelerating condition and/or turning condition. Namely, even if a certain length of time elapses from a point in time at which the command SPI was increased to the value at which the SPI is held, the running condition is approximate to the running condition obtained at a time point before the above-indicated time elapses; therefore, even if the instantaneous SPI is lower than the held command SPI, satisfaction of the condition for starting reduction as described above is delayed, and the command SPI is held at the previous given value. Control or operation for the delay may be performed by resetting the sum (accumulated value) of the elapsed time or the integral value of the deviation as described above, and restarting accumulation of elapsed time or integration of the deviation, or by subtracting a given amount from the sum (accumulated value) or the integral value, or by interrupting the accumulation or integration for a specified period of time.

Figure 3:
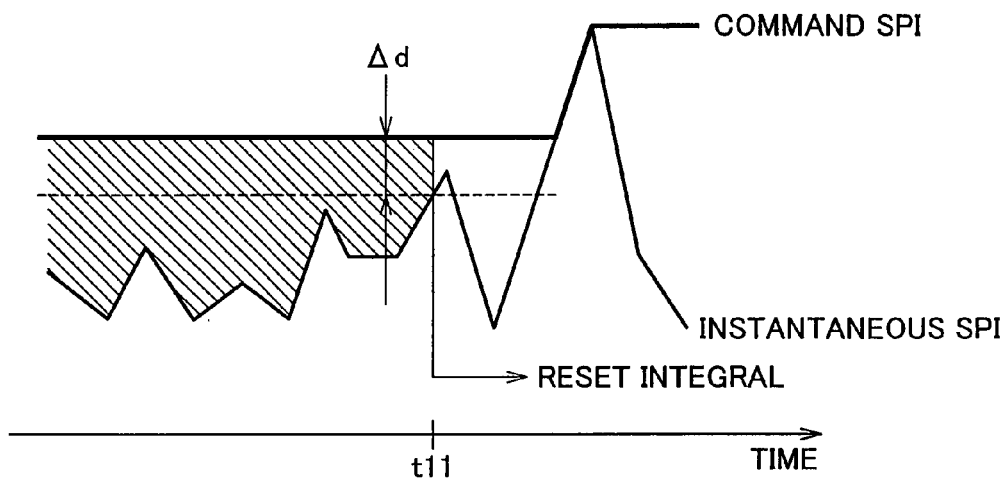
FIG. 3 is a view useful for explaining integration of a deviation between the instantaneous SPI and the command SPI with respect to time, and a situation where the integral value is reset, according to one embodiment of the invention.

FIG. 3 is a schematic view useful for explaining the integration of the above-described deviation and resetting thereof. The area of a hatched portion in FIG. 3 represents the integral value of the deviation. During the process, the integral value is reset and returned to zero at time t11 at which a difference between the instantaneous SPI and the command SPI becomes equal to or smaller than a predetermined value Δd, and the integration of the difference or deviation is started again. Namely, the integral value is reset based on whether a difference between the instantaneous SPI obtained at this time and the command SPI held at a given value is equal to or smaller than a threshold value. Accordingly, the condition for starting reducing the command SPI is not satisfied, and, therefore, the command SPI is kept at the given value previously obtained. Then, if the instantaneous SPI becomes larger than the held command SPI after the integration is restarted, the command SPI is updated to a large value corresponding to the instantaneous SPI, and is held at this value, and the above-described integral value is reset.

When the condition for starting control for reducing the command SPI is determined based on the above-indicated integral value, the degree or rate of reduction of the command SPI may be varied. The above-described integral value is obtained by integrating a deviation between the held command SPI and the instantaneous SPI with respect to time; therefore, if the deviation is large, the integral value reaches the predetermined value in a relatively short time, and the above condition is satisfied. If the deviation is small, it takes a relatively long time for the integral value to reach the predetermined value so that the above condition is satisfied.

Accordingly, the degree or rate of reduction of the command SPI may be varied according to the length of the time lapsed until the condition for starting control for reducing the command SPI as described above is satisfied, for example. If the above condition is satisfied in a short time, it means that the instantaneous SPI is smaller by a large degree than the command SPI held at a given value, and the command SPI greatly deviates from the driver's intention at that time. In this case, therefore, the command SPI is reduced by a large degree or at a high rate. To the contrary, if it takes a relatively long time until the above condition is satisfied, it means that the instantaneous SPI is smaller by a small degree than the command SPI held at a given value, and it cannot be said that the held command SPI deviates particularly greatly from the driver's intention at that time. In this case, therefore, the command SPI is slowly reduced by a small degree or at a low rate. It is thus possible to promptly and appropriately correct (reduce or eliminate) a discrepancy between the command SPI for setting the running characteristics and the driver's intention, and set the running characteristics of the vehicle matching the running condition.

The above-mentioned command SPI represents running conditions of the vehicle, which include a running environment, such as the gradient of the road surface, the presence of a corner, and the radius of curvature of the corner, and the driving orientation of the driver. Namely, the acceleration of the vehicle changes depending on conditions of the road on which the vehicle is running, while the driver performs accelerating, decelerating and turning operations depending on the conditions of the road, and the acceleration changes in accordance with the driver's operations. The vehicle control system according to the embodiment is configured to use the command SPI for control of the running characteristics of the vehicle. In the embodiment, the running characteristics include an acceleration characteristic, turning characteristic, suspension characteristic, sound characteristic, and so forth, and these characteristics are set as needed by changing a control characteristic of the throttle valve 10, shift characteristic of the transmission 13, damping characteristic of the shock absorber 5 of the suspension system 4, assist characteristic of the assist mechanism 18, etc., by means of actuators provided in the respective components or mechanisms. A general tendency of change of the running characteristics is such that, as the command SPI increases, the running characteristics change so as to enable the vehicle to offer a sporty ride. In other words, the command SPI of the embodiment is a parameter that changes operational characteristics, acceleration characteristics, or behavior characteristics. The operational characteristics include the control amounts or control speeds of the motor, engine and transmission, and actuators of, for example, steering and brake assist devices, relative to the amounts of operation of, for example, the steering wheel, accelerator pedal and the brake pedal. The acceleration characteristics or behavior characteristics include control characteristics of actuators of, for example, active stabilizers and suspensions involved in running, which are controlled based on certain command values.

Figure 4:
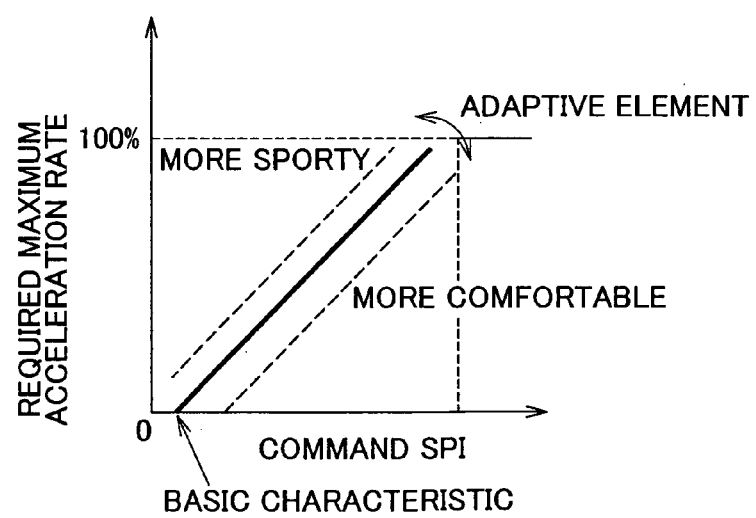
FIG. 4 is a map indicating the relationship between the command SPI and the required maximum acceleration rate according to one embodiment of the invention.

As one example of change of the running characteristics, the acceleration characteristic or performance is changed according to the command SPI in the following manner, as shown in FIG. 4. In this example, the required rate of maximum acceleration corresponding to the command SPI set in the above-described manner is obtained. The required rate of maximum acceleration specifies excess driving force, and the required maximum acceleration rate that is equal to 100% indicates a condition which permits the maximum acceleration that can be generated in the vehicle to be achieved, and in which the speed ratio of the transmission 13 is set to a speed ratio at which the engine speed is maximized, or the largest speed ratio (the speed ratio of the lowest speed). The required maximum acceleration rate that is equal to 50% indicates a condition which permits an acceleration that is a half of the maximum acceleration that can be generated in the vehicle to be achieved, and in which the speed ratio of the transmission 13 is set to an intermediate speed ratio. In the example shown in FIG 4, the required maximum acceleration rate increases as the command SPI increases. A basic characteristic as indicated by the solid line in FIG. 4 is obtained by calculating the relationship between the command SPI and the required maximum acceleration rate, based on data obtained during actual running of the vehicle, and making corrections as needed through running of an actual vehicle or simulation. When a characteristic line is set on one side of the basic characteristic line on which the required maximum acceleration rate is larger than that of the basic characteristic, the acceleration of the vehicle becomes relatively large, resulting in a sporty behavior characteristic or acceleration characteristic (i.e., running characteristics). To the contrary, when a characteristic line is set on the other side on which the required maximum acceleration rate is smaller than that of the basic characteristic, a large acceleration of the vehicle can be instantaneously achieved, resulting in a comfortable behavior characteristic or acceleration characteristic (i.e., running characteristics). The adjustment (i.e., adaptation or tuning) of these characteristics may be done as needed, in accordance with the marketability required of the vehicle. In the basis characteristic, the required maximum acceleration rate is set to zero in a condition where the command SPI is larger than zero, so that a minute-speed running condition, such as a traffic jam or driving into the garage, is prevented from being reflected by control for setting or changing the running characteristics.

Control for changing the acceleration characteristic by causing the above-mentioned required maximum acceleration rate to be reflected by the shift characteristic of the transmission 13 will be described. In a vehicle on which a continuously variable transmission is installed as the transmission 13, or a hybrid vehicle in which the engine speed can be controlled by a motor, a target output or power is calculated based on the vehicle speed and the requested amount of driving force, and the engine speed is controlled so as to achieve the target output or power. The relationship between the vehicle speed and the acceleration for each engine speed is indicated in FIG. 5, and the required maximum acceleration rate obtained from the command SPI based on FIG. 4 as described above is added to the graph of FIG. 5. For example, thick, solid lines in FIG. 5 indicate the required maximum acceleration rates of 100% and 50% thus added. Accordingly, the required engine speed is represented by a line that passes an intersection of a line indicating the required maximum acceleration obtained from the command SPI and a line indicating the vehicle speed detected at this point in time.

In the vehicle including the transmission 13 as explained above with reference to FIG. 12, a basic shift map is provided for controlling the speed ratio to be established by the transmission 13. In the shift map for the continuously variable transmission, the speed ratio is set according to the vehicle speed and the engine speed. In one example of the speed ratio control, which is known as torque demand control, the required driving force is obtained from a driving force map, based on the accelerator pedal stroke as the requested amount of driving force and the vehicle speed, for example, and the required power of the engine is obtained from the required driving force and the vehicle speed or the engine speed. A target engine speed at which the required power is generated at the optimum fuel efficiency is obtained based on an engine speed map, and the speed ratio of the continuously variable transmission is controlled so as to achieve the target engine speed. Namely, the transmission 13 functions as an engine speed control mechanism for controlling the rotational speed of the engine as the driving power source. Since the power of the engine is obtained as the product of the torque and the engine speed, the engine torque that achieves the required power is obtained based on the target engine speed or the vehicle speed corresponding to the target engine speed, and a throttle opening that provides the engine torque is calculated.

Figure 5:
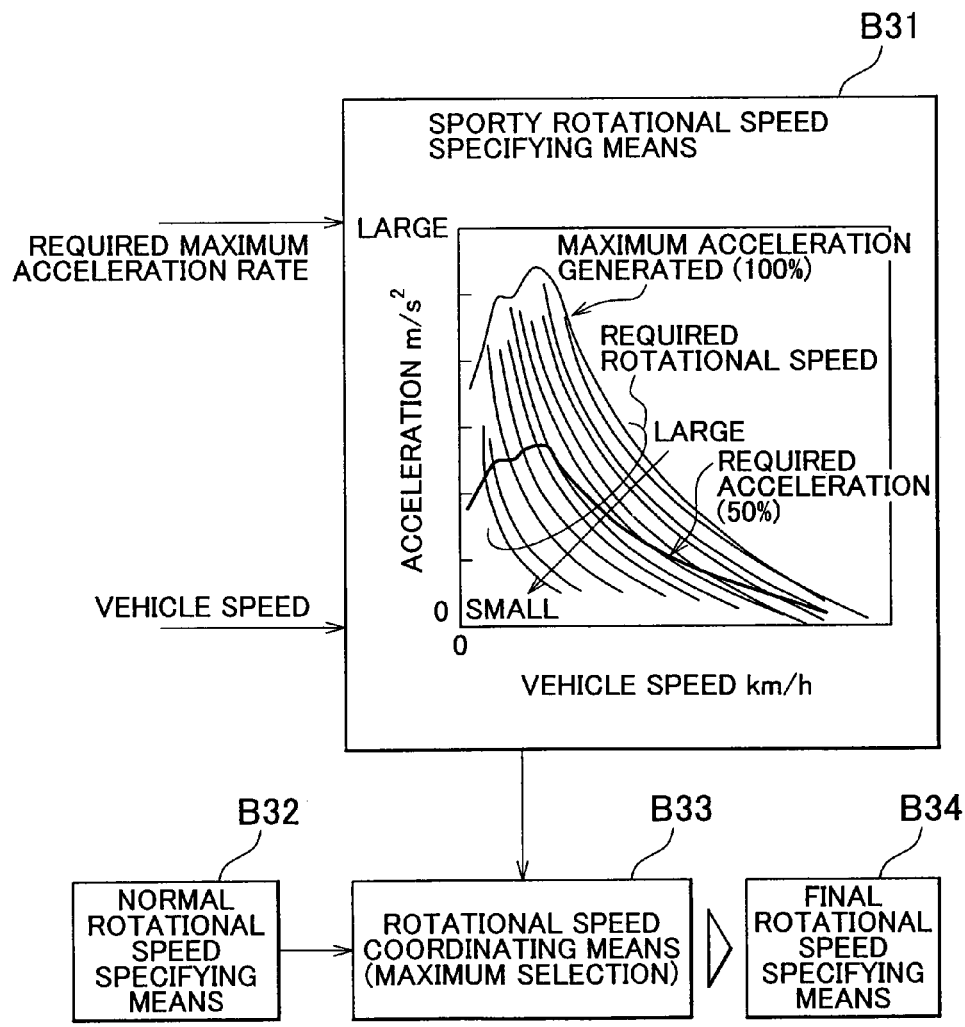
FIG. 5 includes a view in which the required acceleration based on the command SPI is added to. a graph indicating the relationship between the vehicle speed and the acceleration for each required rotational speed according to one embodiment of the invention, and a view showing the process of obtaining a finally specified rotational speed based on the above view.

A sporty rotational speed specifying means B31 as shown in FIG. 5 is a means for specifying a required rotational speed (engine speed) obtained based on the command SPI as described above, and corresponds to the sporty-mode rotational speed calculating means according to the present invention. Also, a normal rotational speed specifying means B32 is a means for specifying a target rotational speed (engine speed) obtained by ordinary engine speed control, such as torque demand control, and corresponds to the normal-mode rotational speed calculating means according to the present invention. The normal rotational speed and the above-indicated sporty rotational speed are compared (coordinated) by a rotational speed coordinating means B33, and the rotational speed having the larger value is selected, which will be called "maximum selection". A final rotational speed specifying means B34 generates the thus selected rotational speed as a control signal. Accordingly, when the accelerator pedal stroke is small, and therefore, the normal rotational speed is lower than the sporty rotational speed, the sporty rotational speed is maintained. It is to be noted that when the requested amount of driving force exceeds a value corresponding to the required maximum acceleration, for example, when the accelerator pedal is depressed by a large degree, downshifting takes place.

For the continuously variable transmission, the above-described control is shift control that aims to establish a lower-vehicle-speed speed ratio (speed ratio having a larger value). As the speed ratio increases under the control, the maximum driving force or engine brake force becomes large, and the behavior of the vehicle is controlled with high responsiveness, thus providing a characteristic that offers a sporty ride, or a characteristic that meets with the driving orientation of the driver or a running environment, such as a condition of the road on which the vehicle is running. In the vehicle on which the continuously variable transmission is installed, the above-described control may be executed when, for example, a sporty mode is selected with a mode selection switch installed on the vehicle.

Figure 6:
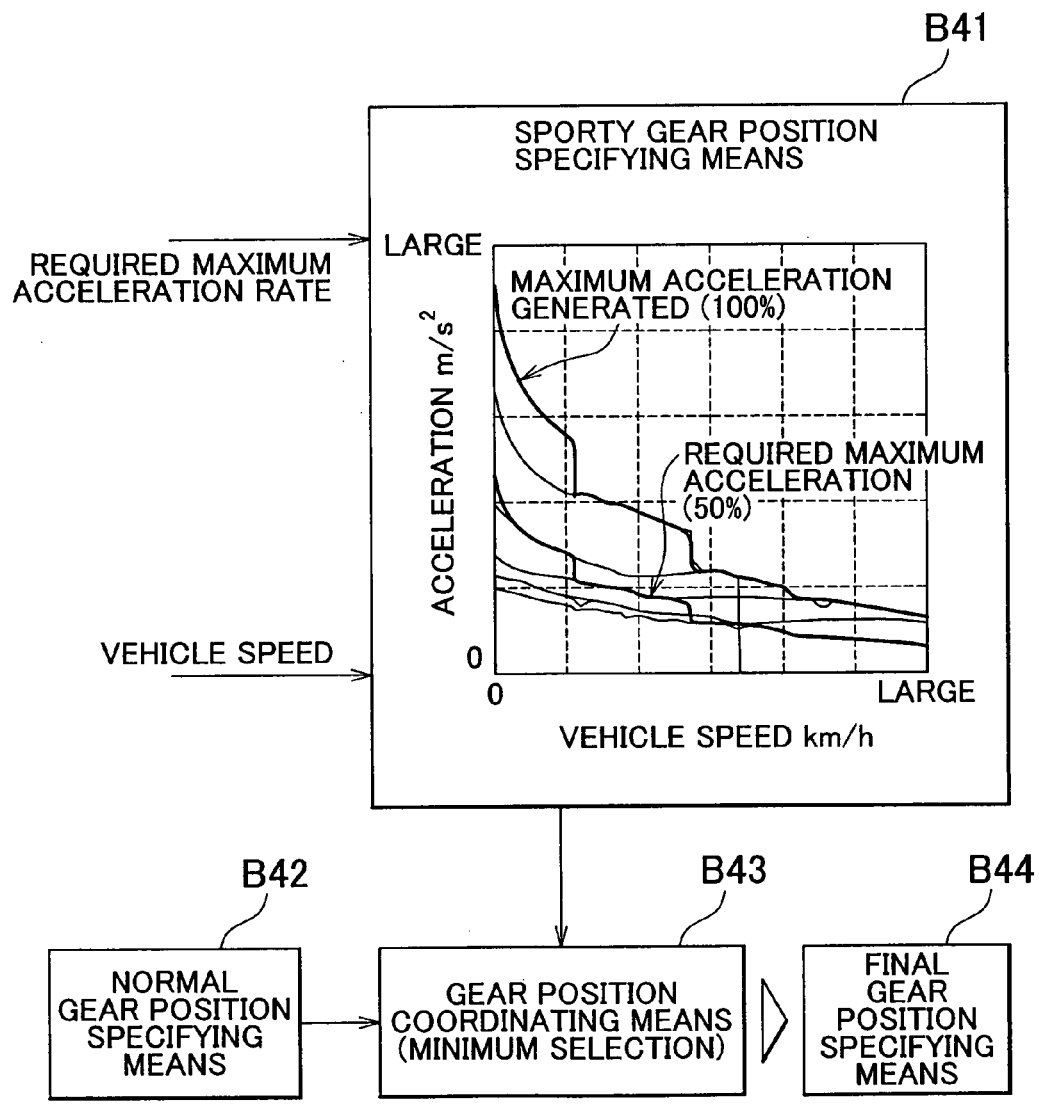
FIG. 6 includes a view in which the required acceleration based on the command SPI is added to a graph indicating the relationship between the vehicle speed and the acceleration for each gear position, and a view showing the process of obtaining a finally specified gear position based on the above view.

On the other hand, the transmission 13, when it has two or more gear positions, is controlled as shown in FIG. 6. In the shift control of the transmission having two or more gear positions, a target gear position is determined, and a control command signal is generated to an actuator of the transmission 13 so as to establish the gear position. FIG. 6 shows the relationship between the vehicle speed and the acceleration for each gear position. Thick solid lines added to the graph of FIG. 6 indicate the required maximum accelerations of 100% and 50% as the required maximum acceleration rates obtained from the command SPI. Accordingly, a target gear position is represented by a line of the gear position which is closest to an intersection of a line indicating the required maximum acceleration obtained from the command SPI and a line indicating the vehicle speed detected at this point in time.

When control is executed by the vehicle control system according to the embodiment, the target sporty gear position obtained in FIG. 6 and a target normal gear position based on a shift diagram prepared in advance (for example, the speed ratio determined based on the accelerating operation and the vehicle speed) are compared (coordinated), and the lower-vehicle-speed gear position having the larger speed ratio is selected, which will be called "minimum selection". The target normal gear position of the transmission having two or more gear positions is set based on the shift diagram (shift map) in which a region of each gear position is defined by the requested amount of driving force, such as an accelerator pedal stroke, and the vehicle speed. Accordingly, downshifting takes place when the requested amount of driving force exceeds a value corresponding to the required maximum acceleration, for example, when the accelerator pedal is depressed by a large degree, and upshifting can take place when the vehicle speed further increases.

A sporty gear position specifying means B41 as shown in FIG. 6 is a means for specifying a gear position obtained based on the above-described command SPI, and a normal gear position specifying means B42 is a means for specifying a gear position obtained based on an ordinary shift diagram set using the accelerator pedal stroke and the vehicle speed. The sporty gear position and the normal gear position are compared (coordinated) by a gear position coordinating means B43, and the lower-speed gear position (the gear position having the larger speed ratio) is selected, namely, "minimum selection" is made. A final gear position specifying means B44 generates the thus selected gear position as a control signal. Namely, the transmission 13 functions as an engine speed control mechanism for controlling the rotational speed of the engine as a driving power source. Accordingly, when the accelerator pedal stroke is small, and therefore, the normal gear position is a higher-speed gear position than the sporty gear position, the sporty gear position is maintained, and the lower-vehicle-speed gear position (having the larger speed ratio) is established.

For the transmission having two or more gear positions, the above-described control is shift control that aims to establish a lower-vehicle-speed gear position (speed ratio having a larger value). As the speed ratio increases under the control, the maximum driving force or engine brake force becomes large, and the behavior of the vehicle is controlled with high responsiveness, thus providing a characteristic that offers a sporty ride, or a characteristic that meets with the driving orientation of the driver or a running environment, such as a condition of the road on which the vehicle is running. The above control may be executed when, for example, a sporty mode is selected with a mode selection switch installed on the vehicle, and the control may be prohibited when, for example, the sporty mode is not selected.

The above-mentioned electronic control unit 28 may have the functions of the respective means shown in FIG. 5, or the functions of the respective means shown in FIG 6. Alternatively, an electronic control unit for sporty-mode control may be provided, and the electronic control unit for sporty-mode control may have the above-indicated functions.

Namely, when the engine speed is increased or the gear position is changed to a lower-speed gear position, according to an increase of the requested amount of driving force, the engine speed or the lower-speed gear position may be set in the following manner. The driving force of the vehicle or the required acceleration based on the driving force is determined based on the requested amount of driving force, such as an accelerator pedal stroke, and the vehicle speed. Therefore, when the required acceleration obtained based on the requested amount of driving force exceeds the acceleration obtained from the required maximum acceleration rate obtained based on the above-mentioned command SPI and the vehicle speed, the engine speed or the gear position may be set so as to generate the required acceleration obtained based on the requested amount of driving force, such as an accelerator pedal stroke. Alternatively, since the maximum acceleration that can be generated at the time when the requested amount of driving force is increased is determined by the vehicle speed and the speed ratio, the engine speed or the gear position may be set so as to generate an acceleration obtained by dividing a deviation between the maximum acceleration that can be generated and the acceleration obtained from FIG. 5 or FIG. 6 based on the command SPI proportionally by the ratio of the requested amount of driving force, such as an accelerator pedal stroke, to the maximum value thereof. Namely, intermediate points between the maximum acceleration that can be generated and the acceleration obtained from, for example, FIG. 5 or FIG. 6 based on the command SPI may be interpolated in accordance with the requested amount of driving force.

When the acceleration based on the command SPI is switched to the acceleration based on the requested amount of driving force, the control response of the switching may be made faster as the command SPI is already larger. If the command SPI is already large, it is considered that the driver wishes more sporty running, or crisper running; since the requested amount of driving force is further increased in this condition, the acceleration performance of the vehicle may be enhanced by promptly achieving the target engine speed selected by the "maximum selection" or the gear position selected by the "minimum selection". If, on the other hand, the command SPI is relatively small, it is considered that the driver wishes milder or less sporty running; therefore, the target engine speed selected by the "maximum selection" or the gear position selected by the "minimum selection" may be slowly achieved. In this manner, the acceleration changes smoothly, and a deviation from the desired acceleration characteristic or performance is small; therefore, the driver is prevented from feeling uncomfortable about the acceleration.

Figure 7:
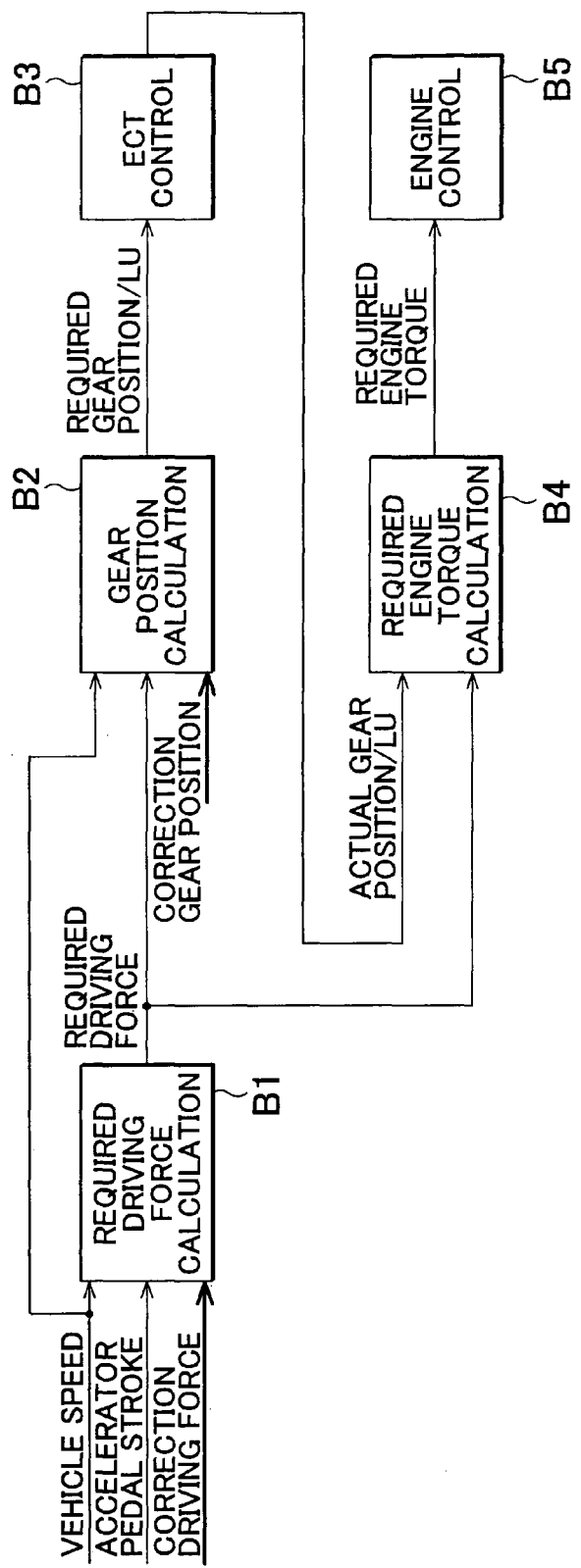
FIG. 7 is a block diagram of control for causing shift control and engine output control to reflect a correction gear position and correction driving force obtained based on the command SPI, in a vehicle in which an automatic transmission having two or more gear positions is installed, according to one embodiment of the invention.

Next, control for correcting the gear position and the driving force and resulting changes in the running characteristics when the vehicle control system of the invention is applied to the vehicle on which the internal combustion engine is installed as the driving power source and the transmission having two or more gear positions is installed will be described. FIG. 7 shows an example in which a target gear position and a target engine torque are obtained from the required driving force. Initially, the required driving force is calculated from the vehicle speed and the accelerator pedal stroke (block B1). Since the required driving force is determined by, for example, the weight of the vehicle body and the power performance given to the vehicle, a map that defines the required driving force in relation to the vehicle speed and the accelerator pedal stroke is prepared in advance, and the calculation in block B1 is performed by determining the required driving force based on the map. On one hand, the gear position (or the speed of the transmission) is calculated based on the required driving force (block B2). The shift control of the transmission having two or more gear positions is performed based on a shift diagram in which regions of respective gear positions, or upshifting lines and downshifting lines, are set using the vehicle speed and required driving force as parameters. Thus, the gear position is calculated in block B2 based on the shift diagram prepared in advance. The required gear position thus obtained is generated as a control command signal to a shift control device (ECT) B3 where shift control of the transmission 13 is carried out. If a lock-up clutch (LU) is provided in the power transmission path of the vehicle 1, engagement/release of the lock-up clutch is determined based on a map prepared in advance, and a command signal for controlling the engagement/release of the lock-up clutch is also generated.

On the other hand, the required engine torque is calculated based on the required driving force obtained in the above-indicated block B1 and the actual gear position of the transmission 13 (block B4). Since the engine speed is determined based on the gear position and the vehicle speed, the required engine torque can be calculated based on the engine speed and the required driving force. Then, the engine 8 is controlled so as to produce the thus obtained engine torque (block B5). More specifically, the throttle opening is controlled.

In the vehicle control system according to the invention, the command SPI is changed based on the instantaneous SPI such as the longitudinal acceleration Gx, the lateral acceleration Gy, or the composite acceleration into which these accelerations Gx, Gy are combined, and the required maximum acceleration is changed in accordance with the change of the command SPI. The required maximum acceleration is reflected by the shift control as explained above with reference to FIG. 6. If the gear position determined based on the command SPI in the sporty mode (sporty) is a lower-vehicle-speed gear position than the gear position in the normal mode (normal), the lower-vehicle-speed gear position is set as the finally specified gear position. The basic arrangement explained above with reference to FIG. 7 is adapted to perform shift control in the normal mode; therefore, if the finally specified gear position based on the command SPI is the lower-vehicle-speed gear position, this gear position is received by block B2, and is set as the required gear position. As a result, a relatively large speed ratio is obtained. Therefore, the maximum driving force or engine brake force becomes large, and the behavior of the vehicle is controlled with high responsiveness, thus providing a characteristic that offers a sporty ride, or a characteristic that meets with the driving preference of the driver or a running environment, such as a condition of the road on which the vehicle is running.

To provide an acceleration characteristic commensurate with the command SPI, the power generated by the engine 8 may be increased or reduced. For control of the power, block Bi as described above receives correction driving force, and increases or reduces the required driving force obtained by the above-described basic arrangement, using the correction driving force. The control system may be configured to obtain the correction driving force, based on the command SPI as described above. For example, the relationship between the command SPI and the correction driving force may be determined by, for example, experiment or simulation conducted according to the driver's intention, and the relationship may be prepared in advance as data in the form of a map, for example. Then, the correction driving force may be obtained from data, such as the command SPI obtained during running, and the correction driving force map.

Figure 8:
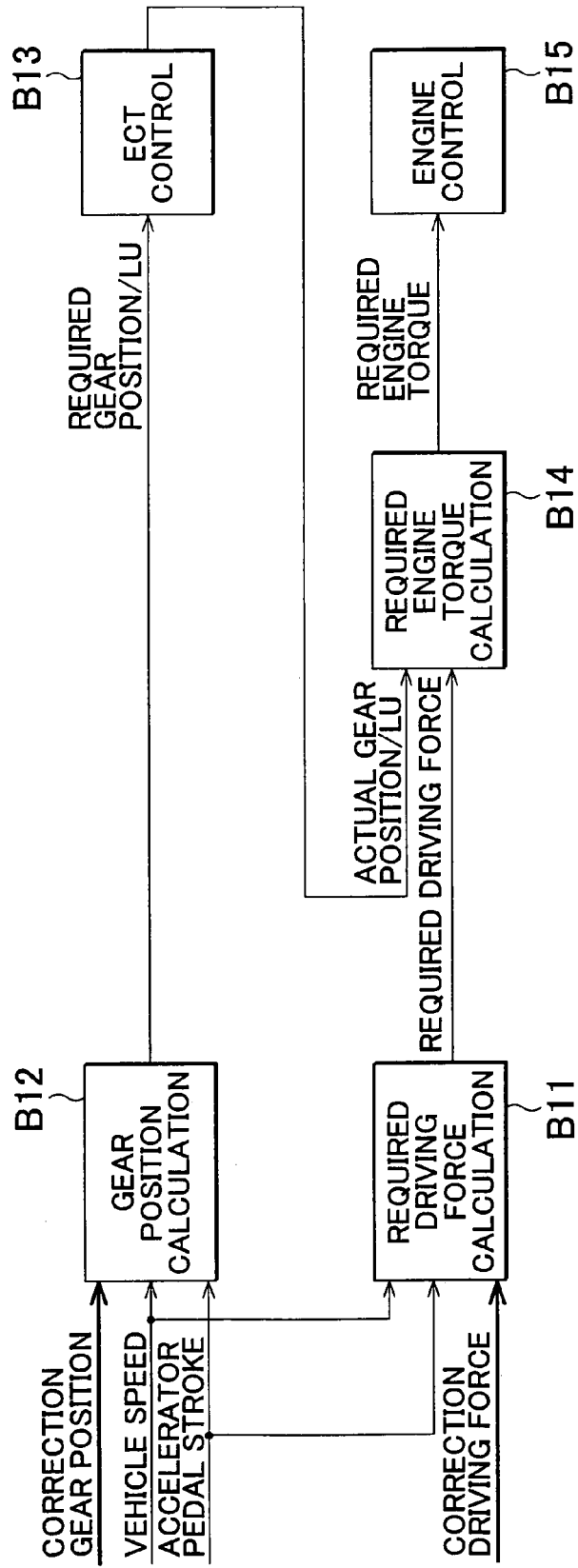
FIG. 8 is a block diagram of another control for causing shift control and engine output control to reflect the correction gear position and correction driving force obtained based on the command SPI, in a vehicle on which an automatic transmission having two or more gear positions is installed, according to one embodiment of the invention.

FIG. 8 shows an example in which the gear position and the required driving force are obtained in parallel with each other, from the vehicle speed and the accelerator pedal stroke. As described above, the speed ratio of the transmission having two or more gear positions is controlled based on the shift diagram in which the gear positions, or the upshifting lines and downshifting lines, are set based on the vehicle speed and the accelerator pedal stroke; therefore, on one hand, the gear position is calculated (in block B12) from the vehicle speed and the accelerator pedal stroke, and, on the other hand, the required driving force is calculated (in block B11) from the vehicle speed and the accelerator pedal stroke. The calculation of the required driving force is similar to the calculation in block B1 shown in FIG. 7 as described above.

The required gear position obtained in block B12 is transmitted to a shift control device (ECT) B13 where shift control is performed on the transmission 13. If a lock-up clutch (LU) is provided in the power transmission path of the vehicle 1, engagement/release of the lock-up clutch is determined based on a map that is prepared in advance, and a command signal for controlling the engagement/release of the lock-up clutch is generated as well.

On the other hand, the required engine torque is calculated (in block B14) based on the required driving force obtained in the above-indicated block B11 and the actual gear position of the transmission 13, and the engine 8 is controlled so as to produce the thus obtained engine torque (block B15). The control in block B14 is similar to the control in block B4 shown in FIG. 7 as described above, and the control in block B15 is similar to the control in block B5 shown in FIG. 7 as described above.

In the arrangement as shown in FIG. 8, too, if the finally specified gear position based on the command SPI is the lower-vehicle-speed gear position, this gear position is received by block B12, and is set as the required gear position. As a result, a relatively large speed ratio is set, resulting in an increase in the acceleration performance as a running characteristic of the vehicle. Also, block B11 receives correction driving force corresponding to the command SPI, and increases or reduces the required driving force determined by the basic arrangement as described above, using the correction driving force.

Figure 9:
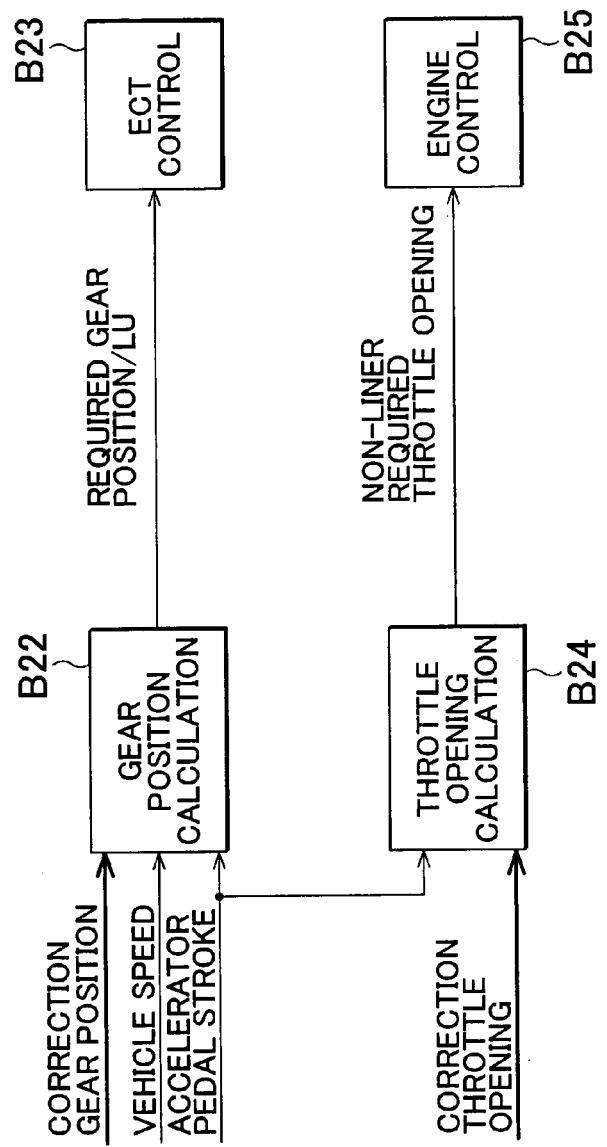
FIG. 9 is a block diagram of further control for causing shift control and engine output control to reflect the correction gear position and correction driving force obtained based on the command SPI, in a vehicle on which an automatic transmission having two or more gear positions is installed, according to one embodiment of the invention.

FIG. 9 shows an example in which the transmission 13 and the engine 8 are controlled independently of each other, based on the vehicle speed and the accelerator pedal stroke. Namely, the gear position is calculated (in block B22) based on the vehicle speed and the accelerator pedal stroke, and the required gear position obtained by the calculation is transmitted to a shift control device (ECT) B23 where shift control is performed on the transmission 13. These controls are similar to those of block B12 and block B13 as shown in FIG 8. Also, the throttle opening is calculated (in block B24) based on the accelerator pedal stroke, and the engine 8 is controlled (in block B25) according to the required throttle opening. Where the engine 8 has an electronic throttle valve, the relationship between the accelerator pedal stroke and the throttle opening is generally a non-linear relationship. Thus, in a condition where the accelerator pedal stroke is relatively small, the amount of change of the throttle opening is small relative to the amount of change of the accelerator pedal stroke. When the accelerator pedal stroke is relatively large, the relationship between the amount of change of the accelerator pedal stroke and the amount of change of the throttle opening is close to a one-to-one relationship.

With the basic arrangement as shown in FIG. 9, if the finally specified gear position based on the command SPI is the lower-vehicle-speed gear position, this gear position is received by block B22, and is set as the required gear position. As a result, a relatively large speed ratio is set, and the acceleration performance as a running characteristic of the vehicle is enhanced. Also, block B24 receives a correction throttle opening corresponding to the command SPI, and increases or reduces the required throttle opening obtained by the above-described basic arrangement, using the correction throttle opening. Namely, when the command SPI becomes large, the output characteristic of the driving source relative to the accelerating operation may be changed (for example, the output characteristic may be increased).

In the vehicle control system according to the invention as described above, when the composite acceleration increases based on the driver's intention of accelerating, decelerating or turning the vehicle, such as when the accelerator pedal 12 is depressed to accelerate the vehicle, or when the brake pedal 7 is depressed to decelerate the vehicle, or when the steering wheel 16 is rotated to turn the vehicle, the command SPI immediately increases in response to the increase of the composite acceleration. As a result, excess driving force increases in accordance with the increase of the command SPI, and the required acceleration is generated instantaneously, thus enabling the vehicle to offer a sporty ride as a running characteristic. Since the above-described operations by the driver are generally performed so as to run the vehicle according to the running environment, such as the gradient of the road on which the vehicle is running, the above-described change in the running characteristic reflects the driver's preferences and the running environment.

For example, when the vehicle starts running on an uphill, the vehicle moves in a direction opposite to a direction in which the acceleration of gravity is applied to the vehicle; therefore, the acceleration sensor generates an output value larger than a value corresponding to the actual acceleration. Therefore, when the vehicle accelerates on an uphill, the instantaneous SPI becomes larger than that when the vehicle accelerates on a flat road having no gradient or inclination. Since the command SPI increases as the instantaneous SPI increases, the acceleration characteristic is changed in a direction in which the acceleration force increases. On the uphill, therefore, relatively large driving force can be obtained. To the contrary, on a downhill, the acceleration sensor generates an output value smaller than a value corresponding to the actual acceleration. Therefore, when the vehicle decelerates on a downhill, the instantaneous SPI becomes relatively small. However, if a braking operation is performed so as to suppress or prevent increase of the vehicle speed on the downhill, the acceleration of gravity is added to the acceleration resulting from the braking operation, and the output value of the acceleration sensor becomes relatively large. As a result, the instantaneous SPI increases, and relatively large engine brake force can be obtained. Accordingly, it becomes unnecessary or less necessary to perform special accelerating/decelerating operations for uphill running and downhill running, thus assuring further improved driveability. Also, generally known uphill/downhill control, such as inhibition or restriction of establishment of a high-vehicle-speed speed ratio, can be reduced or made unnecessary.

Also, in the above-described vehicle control system of the invention, when a running characteristic of the vehicle is changed based on the accelerations in two or more directions, the degree of change of the running characteristic based on the acceleration in a certain direction (in other words, how the acceleration is reflected by the running characteristic) is made different from that based on the acceleration in another direction, in view of the case where the degree of appearance of an acceleration or the magnitude of the acceleration, or the driving sense or feel possessed by the driver or an influence of the acceleration on the behavior, differs depending on the direction of the acceleration. Thus, the running characteristic can be more appropriately changed based on the accelerations in two or more directions.

In the above-described embodiment, an acceleration in any of the longitudinal and lateral directions appears once the vehicle starts running, and the command SPI increases according to the acceleration. On the other hand, reduction of the command SPI is relatively delayed. Therefore, the command SPI and the required maximum acceleration rate increase with the elapsed time or distance travelled after start of running. When the command SPI is increased according to the elapsed time or distance travelled after start of running, the system of the embodiment may be configured to further increase the command SPI if the instantaneous SPI continues to be relatively large values. When the instantaneous SPI is temporarily increased, the command SPI is set according to the instantaneous SPI. On the other hand, when the instantaneous SPI continues to be large values or when the instantaneous SPI assumes large values with a high frequency, the value of the command SPI is gradually increased even if the value of the instantaneous SPI does not exceed the value of the command SPI. For example, when the deviation between the instantaneous SPI and the command SPI becomes small, the command SPI may be increased, even if the value of the instantaneous SPI does not exceed the value of the command SPI.

It is to be noted that factors that influence the running characteristics of the vehicle or determine the running characteristics are not limited to the control of the speed ratio, but also include an output characteristic of engine torque relative to an accelerating operation, steering characteristic as a relationship between the steering angle or steering force and the turn angle of the front wheels, vibration damping characteristic of the suspension system 4, and a turning characteristic based on the ratio of distribution of torque to the front wheels and rear wheels of a four-wheel drive vehicle. The vehicle control system of the invention is operable to change these characteristics, based on the index obtained from the acceleration. For example, in accordance with the above-described command SPI, the output response of the engine 8 is made appropriate, namely, the rate of increase of the throttle opening is made appropriate, the assist torque provided by the assist mechanism 18 is made appropriate, thus making the driver feel appropriately directly about steering, the gear ratio of the steering mechanism 15 is made appropriate, and the turning ability is made appropriate by making the amount of torque distributed to the rear wheels appropriate. The control for changing each characteristic can be implemented by changing the output characteristics of the actuators provided in the respective mechanisms.

Figure 10:
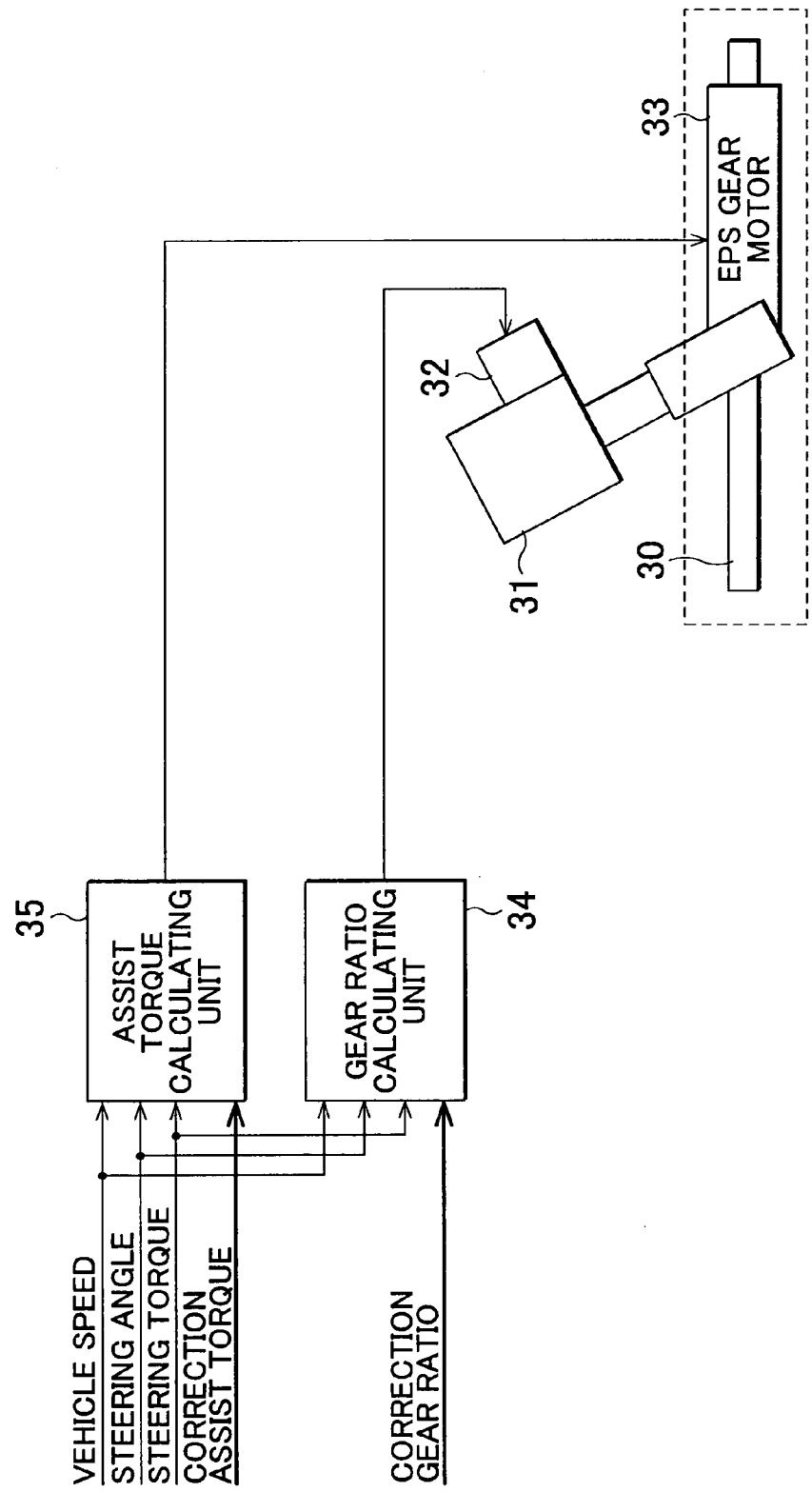
FIG. 10 is a block diagram of control for causing a steering characteristic to reflect a correction gear ratio and correction assist torque obtained based on the command SPI according to one embodiment of the invention.

The vehicle control system of the invention may be used in the case where the steering characteristic or suspension characteristic as one of the running characteristics of the vehicle is changed, as well as the case where the acceleration characteristic or power characteristic of the vehicle is changed FIG. 10 is a block diagram useful for explaining control for changing the steering characteristic based on the above-described command SPI. FIG. 10 schematically shows an electric power steering (EPS) mechanism using a variable gear ratio steering gear (VGRS gear). A rack 30 that moves back and forth in the width direction (lateral direction) of the vehicle in response to the steering force is provided, and a gear of a VGRS gear unit 31 is in mesh with the rack 30. A VGRS actuator 32 for changing the gear ratio is mounted on the VGRS gear unit 31. Also, an EPS gear motor 33 is provided for assisting in movement of the rack 30 in the direction in which the steering force is applied. The EPS mechanism further includes a gear ratio calculating unit 34 that generates a command signal to the VGRS actuator 32 so as to change the gear ratio, and an assist torque calculating unit 35 that calculates torque (thrust applied to the rack 30) to be produced by the EPS gear motor, and generates a command signal representing the torque. As the electric power steering mechanism and respective calculating units, those having generally known arrangements or configurations may be used.

Each of the calculating units 34, 35 receives detection values of the vehicle speed, steering angle and steering torque as data. These items of data can be obtained by sensors provided respectively. In addition, the gear ratio calculating unit 34 receives data indicative of a correction gear ratio. The correction gear ratio is a gear ratio used for correcting the command signal to the VGRS actuator 32, and is set to a value corresponding to the command SPI. More specifically, a map that defines the relationship between the correction gear ratio and the command SPI may be prepared in advance, and the correction gear ratio may be determined according to the map. The relationship between the command SPI and the correction gear ratio may be suitably determined as needed.

On the other hand, the assist torque calculating unit 35 receives correction assist torque as data, in addition to the vehicle speed, steering angle and steering torque as described above. The correction assist torque is torque for correcting the command signal to the EPS gear motor 33, and is set to a value corresponding to the command SPI. More specifically, a map that defines the relationship between the command SPI and the correction assist torque may be prepared in advance, and the assist torque may be determined according to the map. The relationship between the command SPI and the correction assist torque may be appropriately determined as needed.

Accordingly, with the arrangement as shown in FIG. 10, the gear ratio of the VGRS unit 31 is changed, or the assist torque added to the steering force is changed, according to the magnitude of the command SPI obtained based on the acceleration applied to the vehicle.

Figure 11:
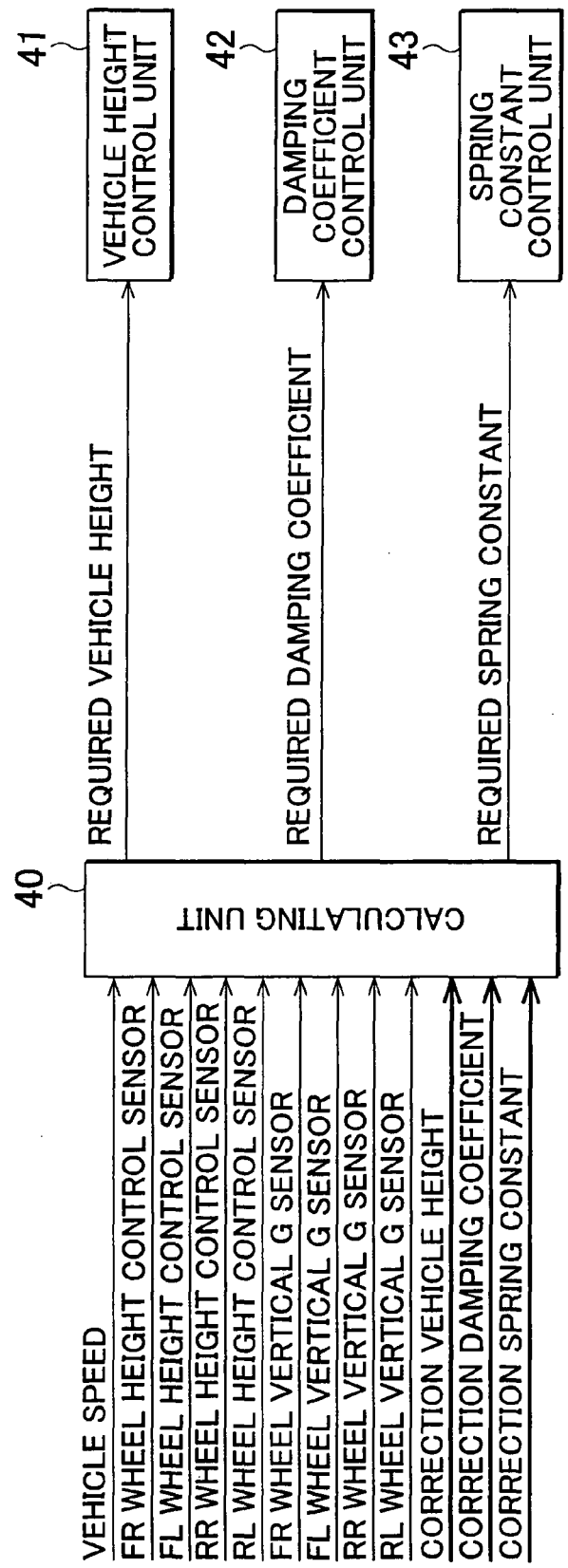
FIG. 11 is a block diagram of control for causing a suspension characteristic to reflect a vehicle height, correction damping coefficient and a correction spring constant obtained based on the command SPI according to one embodiment of the invention.

FIG. 11 is a block diagram useful for explaining control for changing suspension characteristics, based on the above-described command SPI. FIG. 11 shows an example in which the vehicle control system is configured to control the vehicle height, vibration damping coefficient and spring constant associated with a suspension mechanism (not shown). A calculating unit 40 is provided for calculating required values of the vehicle height, vibration damping coefficient and spring constant. The calculating unit 40 consists principally of a microcomputer, as one example, and performs calculations using input data and data stored in advance, so as to obtain the required vehicle height, required damping coefficient, and the required spring constant. Examples of the data include the vehicle speed, detection signal of a front, right (FR) wheel height control sensor, detection signal of a front, left (FL) wheel height control sensor, detection signal of a rear, right (RR) wheel height control sensor, detection signal of a right, left (RL) wheel height control sensor, detection signal of a front, right (FR) wheel vertical G (acceleration) sensor, detection signal of a front, left (FL) wheel vertical G (acceleration) sensor, detection signal of a rear, right (RR) wheel vertical G (acceleration) sensor, and a detection signal of a rear, left (RL) wheel vertical G (acceleration) sensor, as data. These devices are similar to those generally known in the art.

In the example as shown in FIG. 11, the calculating unit 40 receives a correction vehicle height, a correction damping coefficient and a correction spring constant, as data for controlling the suspension characteristics. The correction vehicle height is data for correcting the vehicle height according to the command SPI. For example, a map that defines the relationship between the correction vehicle height and the command SPI may be prepared in advance, and the correction vehicle height may be determined according to the map. Also, the correction damping coefficient is data for correcting the damping coefficient of a device, such as a shock absorber, which performs a vibration damping function. For example, a map that defines the relationship between the correction damping coefficient and the command SPI is prepared in advance, and the correction damping coefficient is determined according to the map. As the command SPI increases, the correction damping coefficient has a larger value, so that the suspension system is set to characteristics that provide a hard or harsh ride. Similarly, the correction spring constant is data for correcting the spring constant of the suspension system. For example, a map that defines the relationship between the correction spring constant and the command SPI may be prepared in advance, and the correction spring constant may be determined according to the map. As the command SPI increases, the correction spring constant is set to a larger value, and the suspension system is set to characteristics that provide a hard or harsh ride.

The above-indicated calculating unit 40 is configured to perform calculations using the data as described above, and generate the required vehicle height thus calculated, as a control command signal, to a vehicle height control unit 41, so as to control the vehicle height according to the command SPI. More specifically, when the command SPI is relatively large, the vehicle height is controlled to be relatively small. Also, the calculating unit 40 is configured to generate the required damping coefficient obtained as a result of calculation, as a control command signal, to a damping coefficient control unit 42, and control the damping coefficient according to the command SPI. More specifically, when the command SPI is relatively large, the damping coefficient is controlled to be relatively large. Furthermore, the calculating unit 40 is configured to generate the required spring constant obtained as a result of calculation, as a control command signal, to a spring constant control unit 43, and control the spring constant according to the command SPI. More specifically, when the command SPI is relatively large, the spring constant is controlled to be relatively large.

As described above, the vehicle control system according to the present invention is able to change the suspension characteristics as one example of the running characteristics, according to a control index, such as the command SPI obtained based on the acceleration, and set the suspension characteristics suitable for the driver's intention, a running environment, and running conditions of the vehicle. As a result, in the case of smooth running with a relatively small longitudinal and/or lateral acceleration(s), the suspension characteristics provide a soft feel or soft ride, thus improving ride comfort. When crisp running of the vehicle is required in which the longitudinal and/or lateral acceleration(s) is/are large, the suspension characteristics provide a hard feel or hard ride, and squatting or bumping of the vehicle body in the longitudinal and lateral directions, or rolling or pitching, is suppressed, thus assuring improved driveability. It is to be noted that accelerations may the absolute values of detection values detected by the acceleration sensors, may be calculated based on information on an operation system and/or movement of the vehicle, or may be combination of the absolute value of the detection value and the value calculated based on the information.

Figure 13:
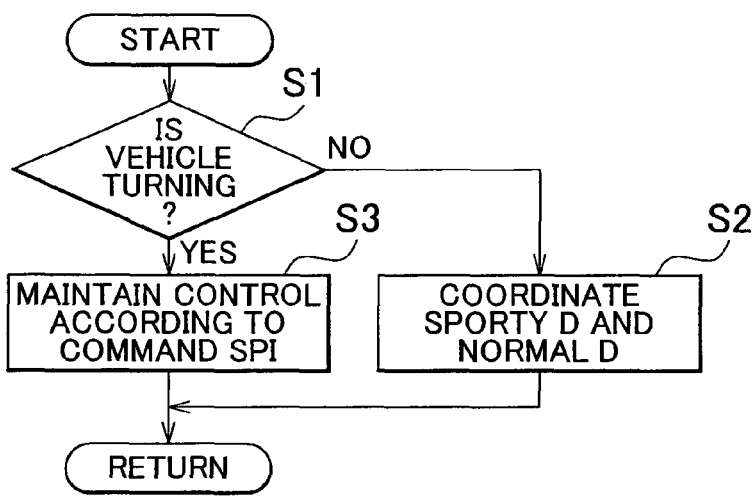
FIG. 13 is a flowchart illustrating a control example for switching between execution of coordination between the sporty mode and the normal mode and non-execution or inhibition of the coordination, according to one embodiment of the invention.

Further, FIG. 13 is a flowchart useful for explaining one example of the other control executed by the vehicle control system of the invention. Initially, it is determined whether the vehicle is turning (step S1). This determination may be made by determining whether the steering angle or turn angle is equal to or larger than a predetermined threshold value, or whether the actual yaw rate applied to the vehicle is equal to or larger than a predetermined value, or whether an angle formed by a vector representing the above-mentioned composite acceleration or the instantaneous SPI and the longitudinal direction of the vehicle is equal to or larger than a predetermined angle. The threshold value or angle based on which the determination is made may be determined in advance by experiment or simulation conducted according to the driver's intention.

When the vehicle is running along a straight path, and thus a negative decision is made in step S1, the coordination between the sporty (sporty drive) and the normal (normal drive) is performed (step S2), and the control returns. The "coordination" is control under which a higher rotational speed, which is selected through "maximum selection" by the rotational speed coordinating means B33 as shown in FIG. 5, is generated to the final rotational speed specifying means B34. Alternatively, the "coordination" is control under which a lower-vehicle-speed gear position, which is selected through "minimum selection" by the gear position coordinating means B43 as shown in FIG. 6, is generated to the final gear position specifying means B44. Thus, the excess driving torque of the vehicle as a whole increases in accordance with the required maximum acceleration, thus enabling the vehicle to run according to the intention of the driver.

On the other hand, if the vehicle is turning, and an affirmative decision is made in step S1, the control of the engine speed or gear position according to the command SPI is maintained (step S3), and the control returns. Further, even if the engine speed or gear position determined based on the requested amount of driving force, such as an accelerator pedal stroke, exceeds the engine speed or gear position determined based on the command SPI, the engine speed or gear position determined based on the command SPI may be maintained.

The vehicle control system according to the invention may be configured to determine an index, such as a command SPI, based on a running condition of the vehicle, such as the above-mentioned composite acceleration, (the instantaneous SPI), replace the index with an intermediate index, such as the required maximum acceleration rate, and set engine speed or speed ratio at which the excess acceleration is obtained, based on the intermediate index. In this case, the driver's intention represented by the index like the instantaneous SPI or command SPI is not necessarily reflected by the running conditions or acceleration characteristic all the time, but the manner in which the sportiness is reflected by the running conditions or acceleration characteristic may differ depending on the situation where the vehicle is running, or driving conditions, or the requested amount of driving force based on the driver's operation. For example, it may be considered that, in a condition where the vehicle runs at a relatively low speed, or the degree of acceleration or deceleration is relatively small, the engine speed need not be raised to be greater than the requested amount of driving force represented by, e.g., the accelerator pedal stroke, or the speed ratio need not be set to a lower-vehicle-speed speed ratio, but the acceleration characteristic or performance may be determined in accordance with the requested amount of driving force based on the driver's operation, even if the instantaneous SPI is determined and the command SPI is determined according to the instantaneous SPI.

Figure 14:
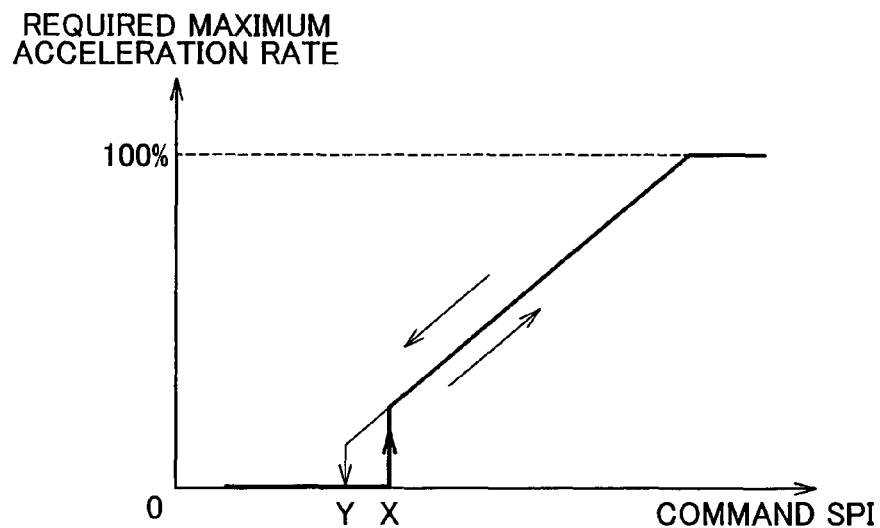
FIG. 14 is a view showing another map that defines the relationship between the command SPI and the required maximum acceleration rate according to one embodiment of the invention.

One example of the control as described above will be explained. In the above-described embodiment in which the command SPI is replaced with or converted to the required maximum acceleration rate, a map as shown in FIG. 14 may be used in place of the map as shown in FIG. 4, for converting the command SPI to the required maximum acceleration rate. In the map as shown in FIG. 14, when the command SPI increases from a value smaller than a first predetermined value Y, the required maximum acceleration ratio is kept at "0" until the command SPI becomes equal to a second predetermined value X that is larger than the first predetermined value Y. Then, the required maximum acceleration rate corresponding to the command SPI is determined at the time when the command SPI reaches the second predetermined value X. The required maximum acceleration rate corresponding to the second predetermined value X is equal to a value obtained according to the map shown in FIG. 4 as described above. Also, when the command SPI is reduced from a value larger than the second predetermined value X, the required maximum acceleration rate corresponding to each command SPI is obtained until the command SPI is reduced beyond the second predetermined value X, down to the first predetermined value Y smaller than the second predetermined value X. Namely, certain hysteresis is set between the command SPI at which the required maximum acceleration rate rises from "0", and the command SPI at which the required maximum acceleration rate falls down to "0".

According to the control using the map as shown in FIG. 14, in a condition where the command SPI is small since the longitudinal acceleration and/or lateral acceleration is/are small, the required maximum acceleration rate is kept at "0", namely, control for improving the acceleration performance is not carried out, that is, the control for improving the acceleration performance is prohibited, and the engine speed or gear position is set based on the requested amount of driving force, such as the stroke of the accelerator pedal operated by the driver. The condition where the command SPI is small takes place, for example, when the vehicle runs in an urban area or a downtown. Even if the longitudinal acceleration or lateral acceleration increases temporarily for some reason during running, and the command SPI increases accordingly, the required maximum acceleration rate does not increase until the command SPI reaches the second predetermined value X, thus permitting running suitable for a running environment, such as an urban area.

On the other hand, after the command SPI becomes equal to or larger than the second predetermined value X, and the required maximum acceleration ratio is set in accordance with the command SPI, even if the command SPI becomes smaller than the second predetermined value X, the required maximum acceleration rate continues to be set according to the command SPI until the command SPI decreases to the first predetermined value Y, and thus the control in accordance with the driver's intention is continued. With the above arrangement in which the hysteresis is provided, hunting of control can be avoided.

While FIG. 2 as described above illustrates the example in which the command SPI is increased stepwise (or in steps), the system of the invention may be configured to linearly (continuously) increase the index explained as the command SPI, Furthermore, the system of the present invention consists principally of an electronic control unit, and the invention is implemented by the electronic control unit.

The control using the vehicle control system of the invention as described above may be implemented in combination with the related art. For example, the control of the invention may be carried out by applying the related art, such as a neurocomputer or a neural network, in the system as described in JP-A-06-249007 to the control technology of the invention.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A vehicle control system that obtains an index based on a running condition of a vehicle, and changes a running characteristic of the vehicle according to the index, comprising:
    an index setting portion that makes a change in the index in response to a change in the running condition in a direction toward crisp running of the vehicle, faster than a change in the index in response to a change in the running condition in such a direction as to reduce crispness with which the vehicle is running, wherein
    the index setting portion includes an index holding portion that repeatedly obtains the index during running of the vehicle and holds, when an obtained index is larger than a last value, the index at the large value, and an index reducing portion that reduces the held value of the index under a predetermined condition, and
    the predetermined condition includes a condition that a time integral value of deviation obtained by integrating a deviation between the obtained value of the index and the held value of the index with respect to time exceeds a predetermined threshold value.

2. The vehicle control system according to claim 1, wherein:
    the index is increased so as to increase the crispness with which the vehicle is running;
    the index setting portion is configured to increase the index upon a change of the running condition, when the running condition changes in such a direction as to increase the index; and
    the index setting portion is configured to reduce the index with a delay relative to a change of the running condition, when the running condition changes in such a direction as to reduce the index.

3. The vehicle control system according to claim 1, wherein:
    the running condition comprises a composite acceleration including a longitudinal acceleration component and a lateral acceleration component of the vehicle; and
    the index setting portion is configured to set the index to a larger value as the composite acceleration is larger.

4. The vehicle control system according to claim 3, wherein
    the composite acceleration includes an acceleration obtained by combining absolute values of the acceleration components in at least two directions including the longitudinal acceleration component and the lateral acceleration component.

5. The vehicle control system according to claim 3, wherein
    the composite acceleration includes an acceleration represented by a square root of a sum of squares of respective acceleration components in a plurality of directions.

6. The vehicle control system according to claim 1, wherein
    when the deviation between the obtained value of the index and the held value of the index is equal to or smaller than a predetermined value set in advance, the index setting portion is configured to reset the time integral value of the deviation and return the time integral value of the deviation to zero.

7. The vehicle control system according to claim 1, wherein
    the vehicle includes a driving power source, and a rotational speed control mechanism that controls a rotational speed of the driving power source,
    the vehicle control system further comprising:
    a sporty-mode rotational speed calculating portion that determines a target rotational speed of the driving power source, based on the index;
    a normal-mode rotational speed calculating portion that determines a target rotational speed of the driving power source, based on a stroke of an accelerator pedal operated by a driver, and a vehicle speed;
    a final rotational speed specifying portion that controls the rotational speed control mechanism so as to achieve a target rotational speed that is a larger value of the target rotational speed determined by the sporty-mode rotational speed calculating portion and the target rotational speed determined by the normal-mode rotational speed calculating portion.

8. The vehicle control system according to claim 7, further comprising
    a target rotational speed holding portion that holds the target rotational speed determined by the sporty-mode rotational speed calculating portion when the vehicle is turning.

9. The vehicle control system according to claim 7, wherein,
    when the target rotational speed determined by the normal-mode rotational speed calculating portion is higher than the target rotational speed determined by the sporty-mode rotational speed calculating portion, the final rotational speed specifying portion controls the rotational speed control mechanism so as to achieve a rotational speed obtained by interpolating a difference between the target rotational speed determined by the sporty-mode rotational speed calculating portion at present time, and a rotational speed that gives rise to a maximum acceleration that is generated in the vehicle, based on the requested amount of driving force.

10. The vehicle control system according to claim 1, wherein:
    while the index is increasing, the vehicle control system does not execute control for improving an acceleration performance of the vehicle until the index reaches a first threshold value, and executes the control for improving the acceleration performance of the vehicle after the index reaches the first threshold value; and
    while the index is decreasing, the vehicle control system executes the control for improving the acceleration performance of the vehicle until the index reaches a second threshold value smaller than the first threshold value, even if the index reaches the first threshold value, and prohibits the control for improving the acceleration performance of the vehicle after the index reaches the second threshold value.

11. The vehicle control system according to claim 1, further comprising
a switch that prohibits control for changing the running characteristic of the vehicle according to the index.

12. The vehicle control system according to claim 1, wherein
a manner in which the held value of the index is reduced is changed according to the time integral value of the deviation.

13. The vehicle control system according to claim 1, wherein
when the obtained value of the index becomes close to the held value of the index and the deviation becomes smaller than a predetermined value set in advance, the time integral value of the deviation is made smaller by being reduced by a predetermined amount.

14. The vehicle control system according to claim 1, wherein
an output characteristic of a driving source relative to an accelerating operation is changed according to the held value of the index.

15. The vehicle control system according to claim 1, wherein
the running characteristic of the vehicle is configured to be changed according to the index held by the index holding portion.

16. A vehicle control system that obtains an index based on a running condition of a vehicle, and changes a running characteristic of the vehicle according to the index, comprising:
an index setting portion that makes a change in the index in response to a change in the running condition in a direction toward crisp running of the vehicle, faster than a change in the index in response to a change in the running condition in such a direction as to reduce crispness with which the vehicle is running, wherein
the index setting portion includes an index holding portion that repeatedly obtains the index during running of the vehicle and holds, when an obtained index is larger than a last value, the index at the large value, and an index reducing portion that reduces the held value of the index under a predetermined condition,
the predetermined condition is satisfied depending on a length of time for which the index is kept being smaller than the held value, and
the index reducing portion is configured to delay satisfaction of the condition when the obtained value of the index becomes close to the held value of the index and the deviation between these values is equal to or smaller than a predetermined value set in advance.

17. The vehicle control system according to claim 16, wherein
the index setting portion obtains a time accumulated value of the deviation by reducing the time accumulated value of the deviation when the satisfaction of the condition is delayed.

18. A vehicle control system that obtains an index based on a running condition of a vehicle, and changes a running characteristic of the vehicle according to the index, comprising:
an index setting portion that makes a change in the index in response to a change in the running condition in a direction toward crisp running of the vehicle, faster than a change in the index in response to a change in the running condition in such a direction as to reduce crispness with which the vehicle is running, wherein
the index setting portion includes an index holding portion that repeatedly obtains the index during running of the vehicle and holds, when an obtained index is larger than a last value, the index at the large value, and an index reducing portion that reduces the held value of the index under a predetermined condition,
the predetermined condition is satisfied depending on a length of time for which the index is kept being smaller than the held value, and
the index reducing portion is configured to reduce the value of the index moderately when time lapsed until the condition is satisfied is relatively long, as compared with a case where the elapsed time is relatively short.

\* \* \* \* \*